(12) United States Patent
Nishihara et al.

(10) Patent No.: US 10,868,288 B2
(45) Date of Patent: Dec. 15, 2020

(54) ATTACHMENT MEMBER FOR BICYCLE BATTERY PACK, BATTERY PACK ASSEMBLY INCLUDING ATTACHMENT MEMBER, AND BICYCLE COUPLING MEMBER

(71) Applicant: Shimano Inc., Osaka (JP)

(72) Inventors: Taihei Nishihara, Osaka (JP); Yuya Yoneda, Osaka (JP); Satoshi Shahana, Osaka (JP); Hiroyuki Miyoshi, Osaka (JP); Pieter D'Haens, The Netherlands (NL)

(73) Assignee: Shimano Inc., Osaka (JP)

( * ) Notice: Subject to any disclaimer, the term of this patent is extended or adjusted under 35 U.S.C. 154(b) by 172 days.

(21) Appl. No.: 15/887,191

(22) Filed: Feb. 2, 2018

(65) Prior Publication Data

US 2018/0241022 A1  Aug. 23, 2018

(30) Foreign Application Priority Data

Feb. 17, 2017  (JP) ................... 2017-028438

(51) Int. Cl.
*H01M 2/10* (2006.01)
*B62M 6/90* (2010.01)
(Continued)

(52) U.S. Cl.
CPC ........... *H01M 2/1083* (2013.01); *B60L 50/64* (2019.02); *B62H 5/001* (2013.01); *B62K 19/40* (2013.01);
(Continued)

(58) Field of Classification Search
CPC ............. H01M 2/1016; H01M 2/1022; H01M 2/1077; H01M 2/1083; B62M 6/90;
(Continued)

(56) References Cited

U.S. PATENT DOCUMENTS 1,853,162 A * 4/1932 Jacobi ................. B60R 25/00
  70/260
3,981,617 A * 9/1976 Milewicz ............ E05B 73/0076
  416/244 B (Continued)

FOREIGN PATENT DOCUMENTS

CN  102120476 A  7/2011
CN  102376910 A  3/2012
(Continued)

*Primary Examiner* — Edward J. Schmiedel
(74) *Attorney, Agent, or Firm* — Global IP Counselors, LLP

(57) ABSTRACT

An attachment member attaches a bicycle battery pack to a frame of a bicycle. The attachment member includes a coupling member and a lock. The coupling member restricts movement of the bicycle battery pack relative to the frame while the attachment member is in an attachment state in which the battery pack is attached to the frame. The coupling member extends through a first frame portion of the frame and coupled to a first housing portion of the housing while the attachment member is in the attachment state. The lock is provided on the coupling member and switchable between a restriction state that restricts movement of the coupling member relative to the housing and the frame, and a release state that permits movement of the coupling member relative to the housing and the frame while the attachment member is in the attachment state.

7 Claims, 13 Drawing Sheets

(51) Int. Cl.
*B60L 50/64* (2019.01)
*H01M 2/34* (2006.01)
*B62H 5/00* (2006.01)
*B62K 19/40* (2006.01)

(52) U.S. Cl.
CPC ............ *B62M 6/90* (2013.01); *H01M 2/1022* (2013.01); *H01M 2/1077* (2013.01); *H01M 2/341* (2013.01); *H01M 2220/20* (2013.01); *H01M 2220/30* (2013.01)

(58) Field of Classification Search
CPC ......... B62K 19/40; B60L 50/64; F16B 39/30; F16B 39/38; F16B 21/02; F16B 21/04; F16B 21/065; F16B 21/073; F16B 21/075; F16B 21/09; F16B 21/10; F16B 21/183; F16B 3/00; F16B 41/005
USPC ....... 411/232, 294, 300, 446, 996, 141, 167, 411/168, 292, 315, 910, 940, 945, 971, 411/977
See application file for complete search history.

(56) References Cited

U.S. PATENT DOCUMENTS

| | | | | |
|---|---|---|---|---|
| 4,016,914 A | * | 4/1977 | Zurko | F16B 5/0208 411/105 |
| 7,409,843 B1 | * | 8/2008 | Rinehart, Sr. | F16B 41/005 70/232 |
| 2006/0208453 A1 | * | 9/2006 | Ishikawa | B62J 11/00 280/288 |
| 2009/0116930 A1 | * | 5/2009 | Reimler | F16B 37/14 411/337 |
| 2010/0186465 A1 | * | 7/2010 | Frantz | F16B 41/005 70/58 |

FOREIGN PATENT DOCUMENTS

| | | |
|---|---|---|
| CN | 202607942 U | 12/2012 |
| CN | 105235807 A | 1/2016 |
| TW | 201600389 A | 1/2016 |
| TW | 201630771 A | 9/2016 |

* cited by examiner

ATTACHMENT MEMBER FOR BICYCLE BATTERY PACK, BATTERY PACK ASSEMBLY INCLUDING ATTACHMENT MEMBER, AND BICYCLE COUPLING MEMBER

CROSS-REFERENCE TO RELATED APPLICATIONS

This application claims priority to Japanese Patent Application No. 2017-028438, filed on Feb. 17, 2017. The entire disclosure of Japanese Patent Application No. 2017-028438 is hereby incorporated herein by reference.

BACKGROUND

Field of the Invention

The present invention generally relates to relates to an attachment member for a bicycle battery pack, a battery pack assembly including the attachment member, and a bicycle coupling member.

Background Information

Japanese Laid-Open Patent Publication No. 2013-1389 (Patent document 1) describes a bicycle battery pack attached to a bicycle frame.

SUMMARY

The bicycle battery pack is attached in a removable manner to the bicycle frame. Accordingly, there is a need for anti-theft measures to improve the usability. One object of the present invention is to provide an attachment member for a bicycle battery pack, a battery pack assembly including the attachment member, and a bicycle coupling member that improve the usability.

In accordance with a first aspect of the present invention, an attachment member for a bicycle battery pack includes a coupling member and a lock. The attachment member is used to attach the bicycle battery pack to a frame of a bicycle. The bicycle battery pack includes a housing configured to accommodate a battery cell. The coupling member restricts movement of the bicycle battery pack relative to the frame while the attachment member is in an attachment state in which the battery pack is attached to the frame. The coupling member is configured to extend through a first frame portion of the frame and coupled to a first housing portion of the housing of the bicycle battery pack while the attachment member is in the attachment state. The lock is provided on the coupling member. The lock is switchably configured to switch between a restriction state in which the lock restricts movement of the coupling member relative to the housing and the frame while the attachment member is in the attachment state, and a release state in which the lock permits movement of the coupling member relative to the housing and the frame while the attachment member is in the attachment state. In accordance with the first aspect, the lock and the coupling member restrict movement of the bicycle battery pack relative to the frame to avert theft of the bicycle battery pack. This improves the usability. Further, the lock is provided on the coupling member. This limits enlargement of the bicycle in contrast with a case where the lock is provided irrelevant to the coupling member.

In accordance with a second aspect of the present invention, the attachment member according to the first aspect is configured so that the coupling member includes a first rod, and the first rod includes an outer circumference and a first threaded portion defined by at least part of the outer circumference. In accordance with the second aspect, the attachment member is stably attached to the bicycle battery pack or the frame by using the first threaded portion.

In accordance with a third aspect of the present invention, the attachment member according to the second aspect is configured so that the first threaded portion is joined with a second threaded portion provided in the first housing portion so that the coupling member restricts movement of the battery pack relative to the frame while the attachment member is in the attachment state. In accordance with the third aspect, the attachment member is stably attached to the bicycle battery pack by joining the first threaded portion and the second threaded portion.

In accordance with a fourth aspect of the present invention, the attachment member according to the second aspect is configured so that the coupling member is configured to extend through a hole or a groove formed in the first housing portion while the attachment member is in the attachment state. The first threaded portion is configured to be joined with a third threaded portion provided on a second frame portion of the frame to restrict movement of the battery pack relative to the frame while the attachment member is in the attachment state. In accordance with the fourth aspect, the attachment member is stably attached to the frame by joining the first threaded portion and the third threaded portion.

In accordance with a fifth aspect of the present invention, the attachment member according to any one of the second to fourth aspects is configured so that the coupling member further includes a restriction portion that contacts the first frame portion and restricts movement of the first rod toward one side in an axial direction while the attachment member is in the attachment state. The lock includes a movable portion that is movable between a first position at which the movable portion is configured to contact at least one of the frame and the battery pack from another side in the axial direction while the attachment member is in the attachment state, and a second position at which the movable portion is configured not to contact the frame and the battery pack from the other side in the axial direction while the attachment member is in the attachment state. In accordance with the fifth aspect, in a case in which the movable portion of the lock contacts at least one of the frame and the bicycle battery pack, the movable portion and the coupling member cooperate to restrict movement of the bicycle battery relative to the frame.

In accordance with a sixth aspect of the present invention, the attachment member according to the fifth aspect is configured so that the movable portion is provided in the first rod and projectable from an outer circumferential surface of the first rod. The movable portion projects out of the outer circumferential surface of the first rod in a case where the movable portion is located at the first position. The movable portion does not project out of the outer circumferential surface of the first rod in a case where the movable portion is located at the second position. In accordance with the sixth aspect, the movable portion projects out of the outer circumferential surface of the first rod in a case where the movable portion is located at the first position so that the movable portion and the coupling member cooperate to restrict movement of the bicycle battery relative to the frame. Further, the movable portion does not project out of the outer circumferential surface of the first rod in a case where the movable portion is located at the first position so that the attachment member can easily be removed from one of the bicycle battery pack and the frame.

In accordance with a seventh aspect of the present invention, the attachment member according to the fifth aspect or the sixth aspect is configured so that the lock further includes an insertion hole and a key cylinder. The insertion hole is exposed from an end surface of the restriction portion and allows for insertion of a key. The key cylinder is configured to be operated by the key to move the movable portion. In accordance with the seventh aspect, a user can use the key to easily switch the lock between a restriction state and a release state. Further, the insertion hole, which allows for the insertion of the key, is exposed from the end surface of the restriction portion. Thus, the user can easily perform a key operation.

In accordance with an eighth aspect of the present invention, the attachment member according to any one of the fifth to seventh aspects further includes an engagement portion that is provided on the restriction portion and is engageable with a tool that rotates the first threaded portion. In accordance with the eighth aspect, the attachment member can be removed from at least one of the frame and the battery pack by rotating the first threaded portion with the tool.

In accordance with a ninth aspect of the present invention, an attachment member for a bicycle battery pack includes a coupling member and a lock attachment portion. The attachment member is used to attach the bicycle battery pack to a frame of a bicycle. The bicycle battery pack includes a housing configured to accommodate a battery cell. The coupling member restricts movement of the bicycle battery pack relative to the frame while the attachment member is in an attachment state in which the battery pack is attached to the frame. The coupling member is configured to extend through a first frame portion of the frame and coupled to a first housing portion of the housing of the bicycle battery pack while the attachment member is in the attachment state. The lock attachment portion is provided on the coupling member. The lock attachment portion is switchably configured to switch in accordance with attachment and removal of a lock between a restriction state in which the lock attachment portion restricts movement of the coupling member relative to the housing and the frame while the attachment member is in the attachment state, and a release state in which the lock attachment portion permits movement of the coupling member relative to the housing and the frame while the attachment member is in the attachment state. In accordance with the ninth aspect, the lock is attached to the coupling member in a state in which the coupling member restricts movement of the bicycle battery frame relative to the frame. This averts theft of the bicycle battery pack. Thus, the usability can be improved. Further, the lock is inserted through the coupling member. This limits enlargement of the bicycle.

In accordance with a tenth aspect of the present invention, the attachment member according to the ninth aspect is configured so that the coupling member includes a first rod, and the first rod includes an outer circumference and a first threaded portion defined by at least part of the outer circumference. In accordance with the tenth aspect, the attachment member is stably attached to the bicycle battery pack or the frame by using the first threaded portion.

In accordance with an eleventh aspect of the present invention, the attachment member according to the tenth aspect is configured so that the first threaded portion is joined with a second threaded portion provided in the first housing portion so that the coupling member restricts movement of the battery pack relative to the frame while the attachment member is in the attachment state. In accordance with the eleventh aspect, the attachment member is stably attached to the bicycle battery pack by joining the first threaded portion and the second threaded portion.

In accordance with a twelfth aspect of the present invention, the attachment member according to the tenth aspect is configured so that the coupling member is configured to extend through a hole or a groove formed in the first housing portion while the attachment member is in the attachment state. The first threaded portion is joined with a third threaded portion provided on a second frame portion of the frame to restrict movement of the battery pack relative to the frame while the attachment member is in the attachment state. In accordance with the twelfth aspect, the attachment member is stably attached to the bicycle battery pack by joining the first threaded portion and the third threaded portion.

In accordance with a thirteenth aspect of the present invention, the attachment member according to any one of the tenth to twelfth aspects is configured so that the lock is attached to the lock attachment member in the restriction state to restrict rotation of the first rod while the attachment member is in the attachment state. The lock is removed from the lock attachment portion in the release state to permit rotation of the first rod. In accordance with the thirteenth aspect, the lock restricts rotation of the first rod and functions to easily obtain the restriction state and the release state.

In accordance with a fourteenth aspect of the present invention, the attachment member according to the thirteenth aspect is configured so that the lock attachment portion includes a through hole that allows for attachment of the lock at a position separated from an end of the coupling member. The lock attachment portion extends from the end of the coupling member in a direction intersecting an axial direction of the first rod. In accordance with the fourteenth aspect, the lock attachment portion extends in the direction intersecting the axial direction of the first rod. Thus, in a case where the lock is attached to the through hole of the lock attachment portion, rotation of the lock results in the lock coming into contact with at least one of the bicycle battery pack and the frame. The attachment of the lock to the through hole of the lock attachment portion restricts removal of the coupling member from the bicycle battery pack and the frame.

In accordance with a fifteenth aspect of the present invention, the attachment member according to any one of the tenth to fourteenth aspect is configured so that the lock attachment portion is formed separately from the coupling member and configured to be coupled to a first end of the coupling member in an axial direction of the first rod. In accordance with the fifteenth aspect, the lock attachment portion and the coupling member are formed separately. Thus, in accordance with whether or not locking is necessary, the lock attachment portion can be attached to and removed from the coupling member.

In accordance with a sixteenth aspect of the present invention, the attachment member according to the fifteenth aspect is configured so that the first end of the coupling member includes a restriction portion that contacts the first frame portion and restricts movement of the first rod toward one side in the axial direction while the attachment member is in the attachment state. In accordance with the sixteenth aspect, the restriction portion contacts the first frame portion to restrict movement of the coupling member toward one side in the axial direction.

In accordance with a seventeenth aspect of the present invention, the attachment member according to the fifteenth or sixteenth aspect is configured so that the coupling member includes a fourth threaded portion at the first end. The lock attachment portion includes a fifth threaded portion configured to be joined with the fourth threaded portion. In accordance with the seventeenth aspect, the coupling member and the lock attachment portion are joined by engaging the fourth threaded portion of the coupling member with the fifth threaded portion of the lock attachment portion.

In accordance with an eighteenth aspect of the present invention, the attachment member according to any one of the fifteenth to seventeenth aspects is configured so that the first end of the coupling member further includes a tool engagement portion that is engageable with a predetermined tool used to operate the coupling member. In accordance with the eighteenth aspect, the coupling member can be removed from at least one of the frame and the bicycle battery pack by engaging the tool with the tool engagement portion.

In accordance with a nineteenth aspect of the present invention, the attachment member according to the eighteenth aspect is configured so that the lock attachment portion covers the tool engagement portion to hinder engagement of the predetermined tool with the tool engagement portion in a state in which the coupling member is attached to the first end. In accordance with the nineteenth aspect, removal of the coupling member from at least one of the frame and the bicycle battery pack with the tool can be disabled in a case where the lock attachment portion is covering the tool engagement portion.

In accordance with a twentieth aspect of the present invention, the attachment member according to the twelfth aspect is configured so that the coupling member further includes a restriction portion provided on a first end in an axial direction of the first rod and contacting the first frame portion to restrict movement of the first rod toward one side in the axial direction while the attachment member is in the attachment state. The third threaded portion extends through the second frame portion while the attachment member is in the attachment state. The lock attachment portion includes a first through hole that extends through the coupling member in the axial direction of the first rod. In accordance with the twentieth aspect, the coupling member extends over the first frame portion and the second frame portion. Thus, attachment of the lock to the first through hole that extends through the coupling member restricts movement of the bicycle battery pack relative to the frame.

In accordance with a twenty-first aspect of the present invention, the attachment member according to the twelfth aspect is configured so that the coupling member includes a restriction portion, provided on a first end in an axial direction of the first rod and contacting the first frame portion to restrict movement of the first rod toward one side in the axial direction while the attachment member is in the attachment state, and a second end, extending through the second frame portion of the frame in a state in which the first threaded portion is joined with the third threaded portion while the attachment member is in the attachment state. The lock attachment portion includes a second through hole extending through the second end in a direction interesting the axial direction of the first rod. In accordance with the twenty-first aspect, the coupling member extends over the first frame portion and the second frame portion. Thus, the attachment of the lock to the second through hole that extends through the coupling member restricts movement of the bicycle battery pack relative to the frame.

In accordance with a twenty-second aspect of the present invention, the attachment member according to the third aspect or the eleventh aspect further includes a second coupling member formed separately from the coupling member. The second coupling member is configured to extend through a third frame portion of the frame and coupled to a third housing portion of the housing to restrict movement of the bicycle battery pack relative to the frame while the attachment member is in the attachment state. The second coupling member includes a second rod. The second rod includes an outer circumference and a sixth threaded portion defined by at least part of the outer circumference. The sixth threaded portion is joined with a seventh threaded portion provided in the first housing portion to couple the bicycle battery pack to the frame. In accordance with the twenty-second aspect, the coupling member and the engagement of the sixth threaded portion of the second coupling member with the seventh threaded portion further restricts movement of the bicycle battery pack relative to the frame.

In accordance with a twenty-third aspect of the present invention, the attachment member according to any one of the first to twenty-second aspects is configured so that the frame includes a shell that accommodates at least part of the bicycle battery pack. The first frame portion includes a side wall of the shell. In accordance with the twenty-third aspect, the coupling member can be coupled to the side wall of the shell of the frame.

In accordance with a twenty-fourth aspect of the present invention, a battery pack assembly includes the attachment member according to any one of the first to twenty-third aspects and a bicycle battery pack attached to the attachment member. In accordance with the twenty-fourth aspect, the attachment member averts theft of the bicycle battery pack.

In accordance with a twenty-fifth aspect of the present invention, a bicycle coupling member includes a first rod, a restriction portion, a movable portion, and a lock. The first rod includes an outer circumference and a first threaded portion defined by at least part of the outer circumference. The restriction portion is provided on a first end in an axial direction of the first rod and projected from the outer circumference of the first rod in a radial direction of the first rod. The movable portion is provided on the first rod and movable between a first position at which the movable portion is projected outward in the radial direction of the first rod from the outer circumference of the first rod and a second position at which the movable portion is retracted from the first position toward the outer circumference of the first rod. The lock is provided on the first rod. The lock is operatively coupled to the movable portion to move the movable portion between the first position and the second position in response to operation of the lock. In accordance with the twenty-fifth aspect, the bicycle coupling member averts theft of the member to which the bicycle coupling member is attached.

In accordance with a twenty-sixth aspect of the present invention, a bicycle coupling member includes a first rod, a restriction portion, a tool engagement portion, a fourth threaded portion, and a lock attachment portion. The first rod includes an outer circumference and a first threaded portion defined by at least part of the outer circumference. The restriction portion is provided on an end in an axial direction of the first rod. The restriction portion projects from the outer circumference of the first rod in a radial direction of the first rod. The tool engagement portion is provided on the end in the axial direction of the first rod. The tool engagement portion is engageable with a predetermined tool used to operate the coupling member. The fourth threaded portion is provided on the end in the axial direction of the first rod. The lock attachment portion includes a fifth threaded portion that is configured to be joined with the fourth threaded portion and a through hole that allows for attachment of a lock. The lock attachment portion covers the tool engagement portion to hinder engagement of the predetermined tool with the tool engagement portion while in a state in which the fifth threaded portion is joined with the fourth threaded portion. In accordance with the twenty-sixth aspect, the coupling member can be removed from the member to which the coupling member is attached by engaging the tool with the tool engagement portion. Further, removal of the coupling member from the member to which the coupling member is attached can be disabled in a case where the lock attachment portion is covering the tool engagement portion. The bicycle coupling member averts theft of the member to which the bicycle coupling member is attached. This improves the usability.

In accordance with a twenty-seventh aspect of the present invention, the bicycle coupling member according to the twenty-sixth aspect is configured so that the first threaded portion and the fifth threaded portion are coaxial and configured to be loosened in the same rotation direction. In accordance with the twenty-seventh aspect, in a state in which the lock attachment portion cannot be rotated, it is difficult to rotate only the coupling member. This further averts theft of the member to which the bicycle coupling member is attached.

The attachment member for a bicycle battery pack, the battery pack assembly including the attachment member, and the bicycle coupling member improve the usability.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
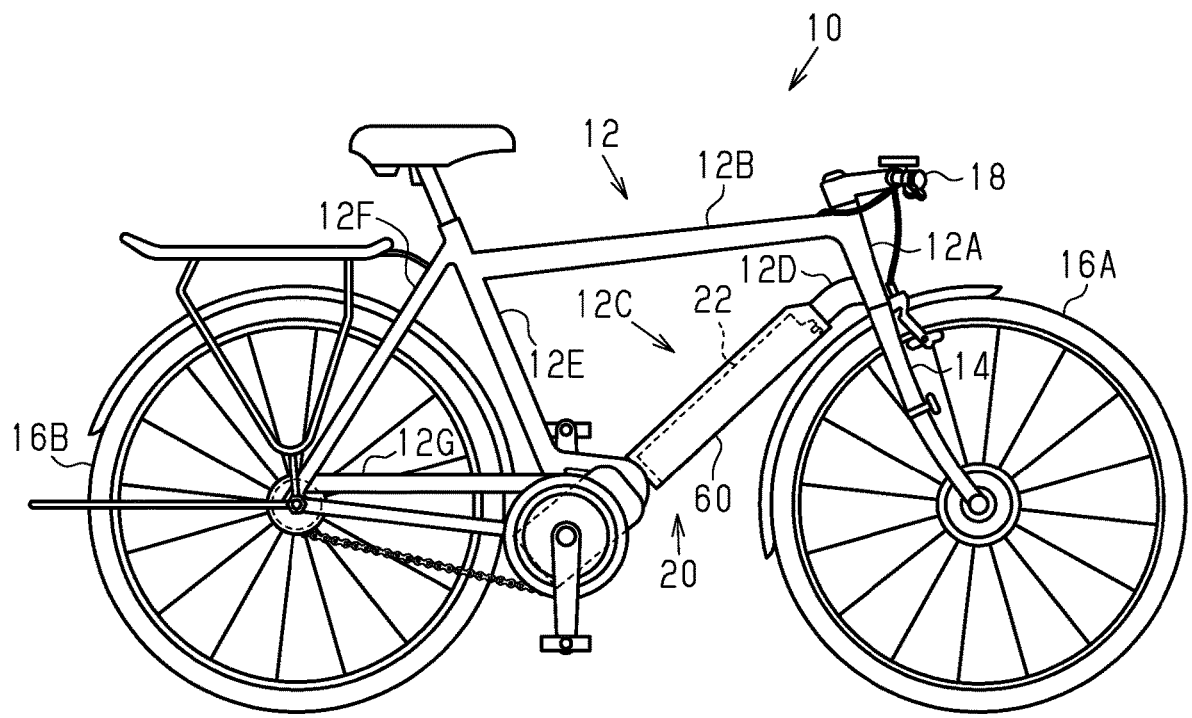
FIG. 1 is a side elevational view of a bicycle including a battery pack assembly in accordance with a first embodiment.

FIG. 1 shows a bicycle 10 including a battery pack assembly 20. In one embodiment, the bicycle 10 further includes a frame 12, a front fork 14, a front wheel 16A, a rear wheel 16B, and a handlebar 18. The frame 12 includes a head tube 12A, a top tube 12B, a down tube 12C, a seat tube 12E, a seat stay 12F and a chain stay 12G.

The battery pack assembly 20 includes an attachment member 80 and a bicycle battery pack 22, to which the attachment member 80 is attached. The bicycle battery pack 22 will simply be referred to as the battery pack 22. In one embodiment, the battery pack assembly 20 further includes a battery attachment portion 60. The battery attachment portion 60 is provided on the frame 12 of the bicycle 10. In one embodiment, the battery attachment portion 60 forms part of the frame 12. In the embodiment shown in FIG. 1, the battery attachment portion 60 forms part of the down tube 12C. The down tube 12C includes a coupling portion 12D, which is coupled to the head tube 12A, and the battery attachment portion 60. In one embodiment, one end of the battery attachment portion 60 is connected to the coupling portion 12D, and the other end of the battery attachment portion 60 is connected to the seat tube 12E. A drive unit mount can be provided between the battery attachment portion 60 and the seat tube 12E. A drive unit is attached to the drive unit mount. The drive unit includes a motor that assists in propulsion of the bicycle 10. The coupling portion 12D can be formed integrally with the battery attachment portion 60 as a one-piece member. Alternatively, the coupling portion 12D can be formed separately from the battery attachment portion 60 and joined integrally with the battery attachment portion 60 through welding or adhering. The battery attachment portion 60 can be separate from the frame 12.

The battery pack 22 is attachable to the battery attachment portion 60. In an attached state, the battery pack 22 is attached to the battery attachment portion 60. The battery pack 22 is configured to supply power to electric elements of the bicycle 10. The electric elements of the bicycle 10 include electric components. The electric components include at least one of a drive unit, an electric transmission, an electric suspension, an electric seatpost, a display, a cycle computer, a lamp and an electric operation device.

Figure 2:
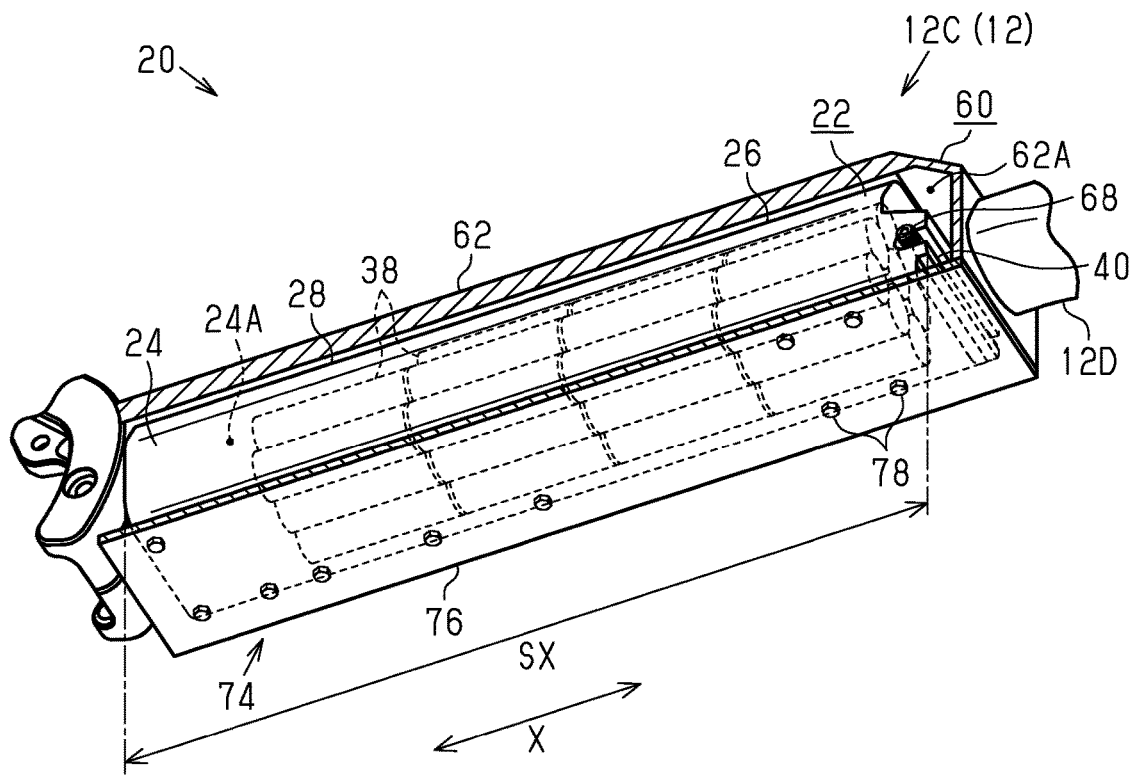
FIG. 2 is a cross-sectional perspective view of an attachment structure for attaching a battery pack of the battery pack assembly shown in FIG. 1 to the bicycle.

FIG. 2 is a cross-sectional view of the battery pack assembly 20 taken along a first direction X. The battery pack 22 includes a housing 24, a plurality of battery cells 38, and a second engagement portion 40. The housing 24 accommodates the battery cells 38. The housing 24 is formed from a resin material. The housing 24 is parallelepiped, and has a dimension in the first direction X that is larger than the dimensions in the other directions. The first direction X is the longitudinal direction of the down tube 12C in an attachment state in which the battery pack 22 is coupled to the battery attachment portion 60. The housing 24 includes an accommodation compartment 24A. The battery cells 38 are accommodated in the accommodation compartment 24A of the housing 24.

The battery attachment portion 60 includes a shell 62 and a first engagement portion 68. The shell 62 accommodates at least part of the battery pack 22. The shell 62 is formed from a metal or fiber reinforced resin. In one embodiment, it is preferred that the shell 62 be formed from the same material as the portion of the frame 12 to which the shell 62 is coupled. The battery pack 22 is attached to the battery attachment portion 60 and accommodated in the shell 62. The shell 62 defines an accommodation compartment 62A that accommodates the battery pack 22. The first engagement portion 68 is provided in, for example, the accommodation compartment 62A.

The second engagement portion 40 of the battery pack 22 is, for example, formed integrally with the housing 24 as a one-piece member. The second engagement portion 40 is engageable with the first engagement portion 68 of the battery attachment portion 60. The second engagement portion 40 is configured to allow the housing 24 to pivot about the first engagement portion 68, for example, in a state in which the second engagement portion 40 is engaged with the first engagement portion 68.

Figure 3:
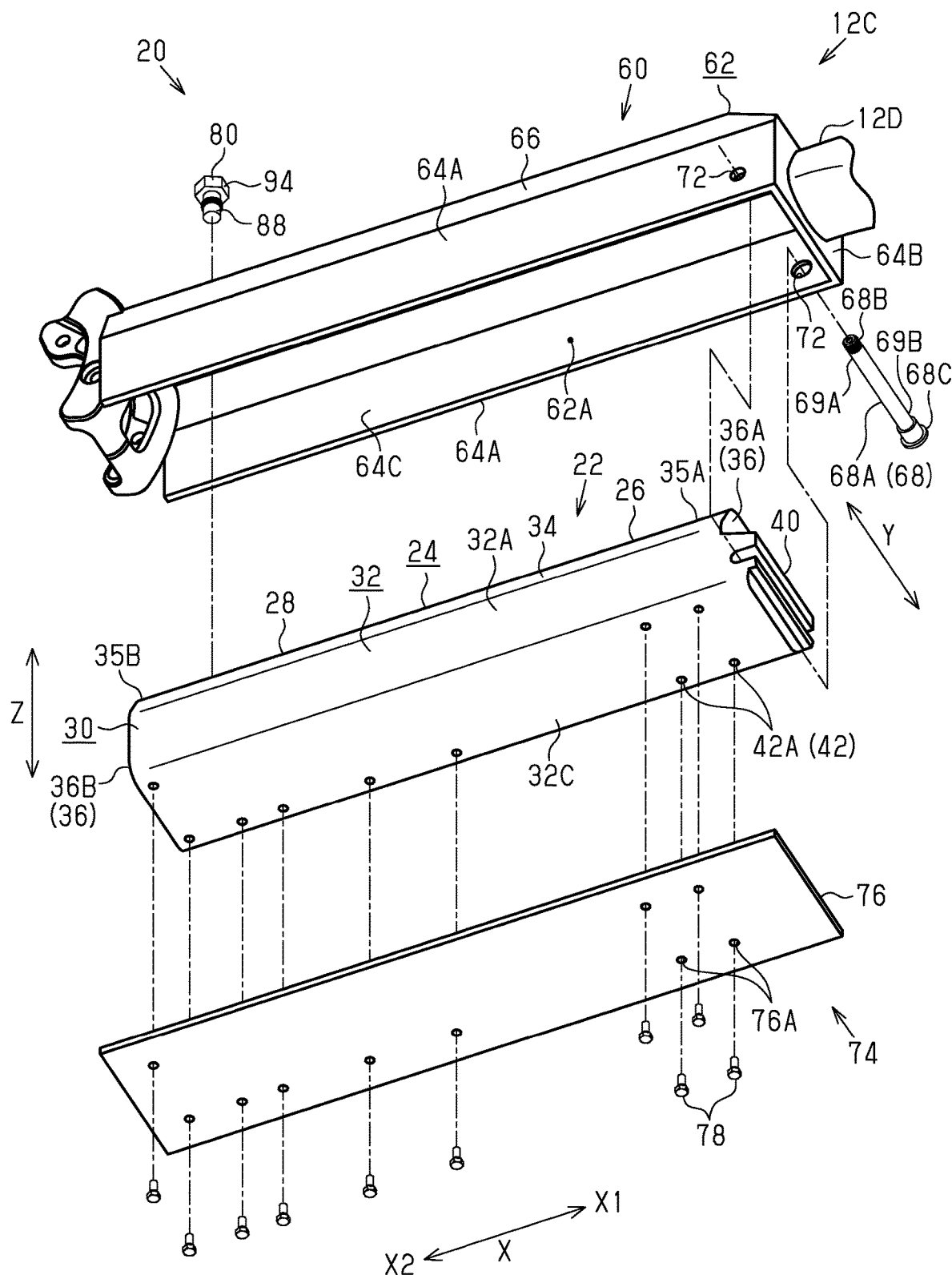
FIG. 3 is an exploded perspective view of the attachment structure for attaching the battery pack of the battery pack assembly shown in FIG. 1 to the bicycle.

As shown in FIG. 3, the shell 62 is substantially plane-symmetric with respect to a plane that extends along a center line of the shell 62 with respect to a second direction Y, which is orthogonal to, for example, the first direction X. The second direction Y is parallel to a widthwise direction that is orthogonal to a front-rear direction of the bicycle 10 (refer to FIG. 1).

The shell 62 includes two side walls 64A and a main wall 66. The two side walls 64A include the surfaces of the shell 62 that extend in the first direction X. The two side walls 64A also include the side surfaces of the shell 62 extending in the second direction Y. The main wall 66 includes a surface of the shell 62 that extends in the first direction X and the second direction Y. The two side walls 64A are continuous with the two ends of the main wall 66 in the second direction Y. The ends of the two side walls 64A and the main wall 66 at the side of the head tube 12A (refer to FIG. 1) in the first direction X are connected to the coupling portion 12D of the down tube 12C. In one embodiment, the two side walls 64A and the main wall 66 at the side of the head tube 12A in the first direction X are continuous with an end surface 64B. The end surface 64B is connected to the coupling portion 12D of the down tube 12C. The two side walls 64A are formed integrally with the main wall 66 as a one-piece member.

The shell 62 further includes a first opening 64C. The shell 62 is formed so that the first opening 64C opens toward, for example, the lower side in a state in which the bicycle 10 is set on level ground. The first opening 64C is continuous with the accommodation compartment 62A of the shell 62. The first opening 64C is sized to allow the battery pack 22 to be inserted into the accommodation compartment 62A. The battery pack 22 is accommodated through the first opening 64C in the accommodation compartment 62A for attachment to the battery attachment portion 60.

The outer shape of the battery pack 22 is substantially plane-symmetric to, for example, a plane that extends along a center line of the battery pack 22 with respect to the second direction Y and is orthogonal to the second direction Y. The outer shape of the battery pack 22 conforms to the outer shape of the housing 24.

The housing 24 has a peripheral portion 30 including a plurality of side surfaces 32 that extend in the first direction X and a pair of end surfaces 36 with respect to the first direction X. The side surfaces 32 include the surfaces of the housing 24 extending in the first direction X. The side surfaces 32 include a first side surface 32A, a second side surface 32B (refer to FIG. 4), a third side surface 32C and a fourth side surface 34. The first side surface 32A and the second side surface 32B each include a side surface of the housing 24 with respect to the second direction Y. The third side surface 32C and the fourth side surface 34 each include a side surface of the housing 24 with respect to a third direction Z that is orthogonal to the first direction X and the second direction Y.

The end surfaces 36 extend in the second direction Y. The end surfaces 36 include a first end surface 36A and a second end surface 36B. In the attachment state in which the battery pack 22 is attached to the battery attachment portion 60, the first end surface 36A is included in a first end portion 35A in the first direction X. Further, in the attachment state in which the battery pack 22 is attached to the battery attachment portion 60, the second end surface 36B is included in a second end portion 35B in the first direction X.

The housing 24 includes a first portion 26 and a second portion 28. The first portion 26 and the second portion 28 extend in the first direction X. The first portion 26 includes, for example, the first end surface 36A and portions of the side surfaces 32 adjacent to the first end surface 36A. The first portion 26 includes, for example, the portion extending from the middle of the housing 24 toward one side X1 in the first direction X. The second portion 28 includes, for example, the second end surface 36B and portions of the side surfaces 32 adjacent to the second end surface 36B. The second portion 28 includes, for example, the portion extending from the middle of the housing 24 in the first direction X toward the other side X2 in the first direction X. The second engagement portion 40 is provided on the first portion 26 of the housing 24. The first portion 26 includes the first end portion 35A. The second portion 28 includes the second end portion 35B. In the illustrated embodiment, the second engagement portion 40 is provided on the first end surface 36A of the housing 24.

The relationship of the first portion 26 and the second portion 28 in the housing 24 can be changed in any manner. In one embodiment, the first portion 26 can include the second end surface 36B and portions of the side surfaces 32 adjacent to the second end surface 36B. The second portion 28 can include the first end surface 36A and portions of the side surfaces 32 adjacent to the first end surface 36A. In this embodiment, the second engagement portion 40 is provided on the second end surface 36B of the housing 24.

The battery pack 22 further includes a cover attachment portion 42. The cover attachment portion 42 is configured to allow for the attachment of a cover 74. The cover attachment portion 42 is provided on, for example, the third side surface 32C of the housing 24. The cover attachment portion 42 includes a plurality of threaded holes 42A. The threaded holes 42A are exposed from the first opening 64C of the shell 62 in the attached state in which the battery pack 22 is attached to the battery attachment portion 60. One example of the number of the threaded holes 42A is ten. The number and location of the threaded holes 42A can be changed in any manner.

The battery pack assembly 20 further includes the cover 74. The cover 74 is attachable to and removable from the battery pack 22. The cover 74 includes a cover body 76 and a plurality of through holes 76A. Preferably, the cover body 76 is configured to close the first opening 64C of the shell 62 in a state in which the battery pack 22 is attached to the battery attachment portion 60. The cover body 76 can be configured to cover only part of the battery pack 22.

The through holes 76A allow for the insertion of bolts 78. The through holes 76A are provided in the cover body 76. The through holes 76A are provided in the cover body 76 at positions corresponding to the threaded holes 42A in a state in which the cover body 76 is attached to the battery pack 22. The bolts 78 are inserted through the through holes 76A into the threaded holes 42A to attach the cover 74 to the battery pack 22. In a state in which the battery pack 22 is accommodated in the accommodation compartment 62A of the shell 62, the battery pack 22 is protected from the outside by the shell 62 and the cover 74. The cover 74 can be attached to the battery pack 22 after attaching the battery pack 22 to the battery attachment portion 60. The battery pack 22 can be attached to the battery attachment portion 60 in a state in which the cover 74 is attached to the battery pack 22. The cover 74 and the cover attachment portion 42 can be omitted from the battery pack assembly 20.

Figure 4:
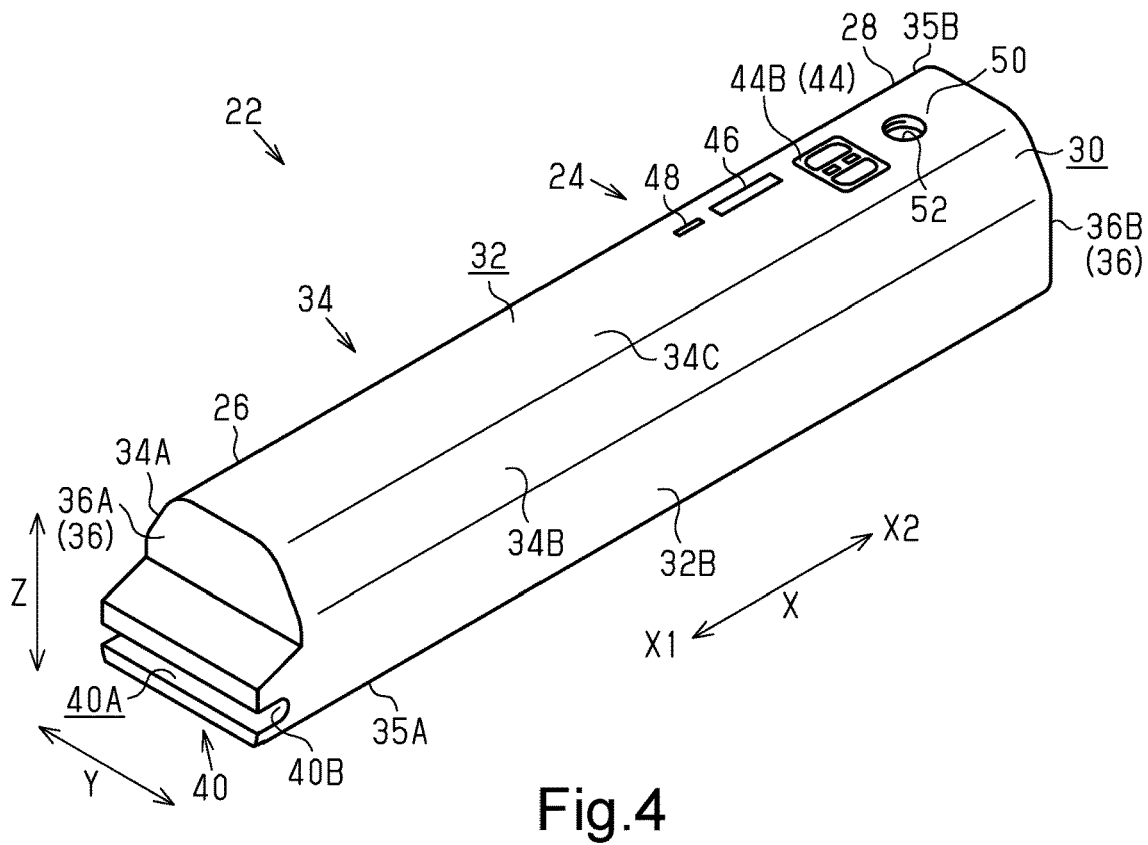
FIG. 4 is a perspective view of the battery pack shown in FIG. 3.

FIG. 4 shows the structure of the second engagement portion 40 of the battery pack 22. The second engagement portion 40, for example, projects from the first end surface 36A of the housing 24. The second engagement portion 40 is, for example, offset in the third direction Z from the middle of the housing 24 toward the third side surface 32C (refer to FIG. 3). The second engagement portion 40 can be offset in the third direction Z from the middle of the housing 24 toward the fourth side surface 34. The second engagement portion 40 can be provided, for example, at the middle of the housing 24 with respect to the third direction Z. The second engagement portion 40 includes a first groove 40A extending in the second direction Y. The first groove 40A, for example, extends from the first side surface 32A (refer to FIG. 5) to the second side surface 32B in the second direction Y. The first groove 40A opens toward the X1 side in the first direction X. The first groove 40A, for example, opens at the two ends in the second direction Y. The first groove 40A includes a curved inner surface 40B and preferably has a generally U-shaped cross section in a direction orthogonal to the second direction Y.

The fourth side surface 34 of the housing 24 includes, for example, a curved portion. The fourth side surface 34 includes a first inclined surface 34A, a second inclined surface 34B, and an intermediate surface 34C. The inclined surfaces 34A and 34B are inclined relative to the intermediate surface 34C. The intermediate surface 34C is provided between the first inclined surface 34A and the second inclined surface 34B in the second direction Y. The first inclined surface 34A is continuous with the first side surface 32A (refer to FIG. 5). The second inclined surface 34B is continuous with the second side surface 32B.

Figure 5:
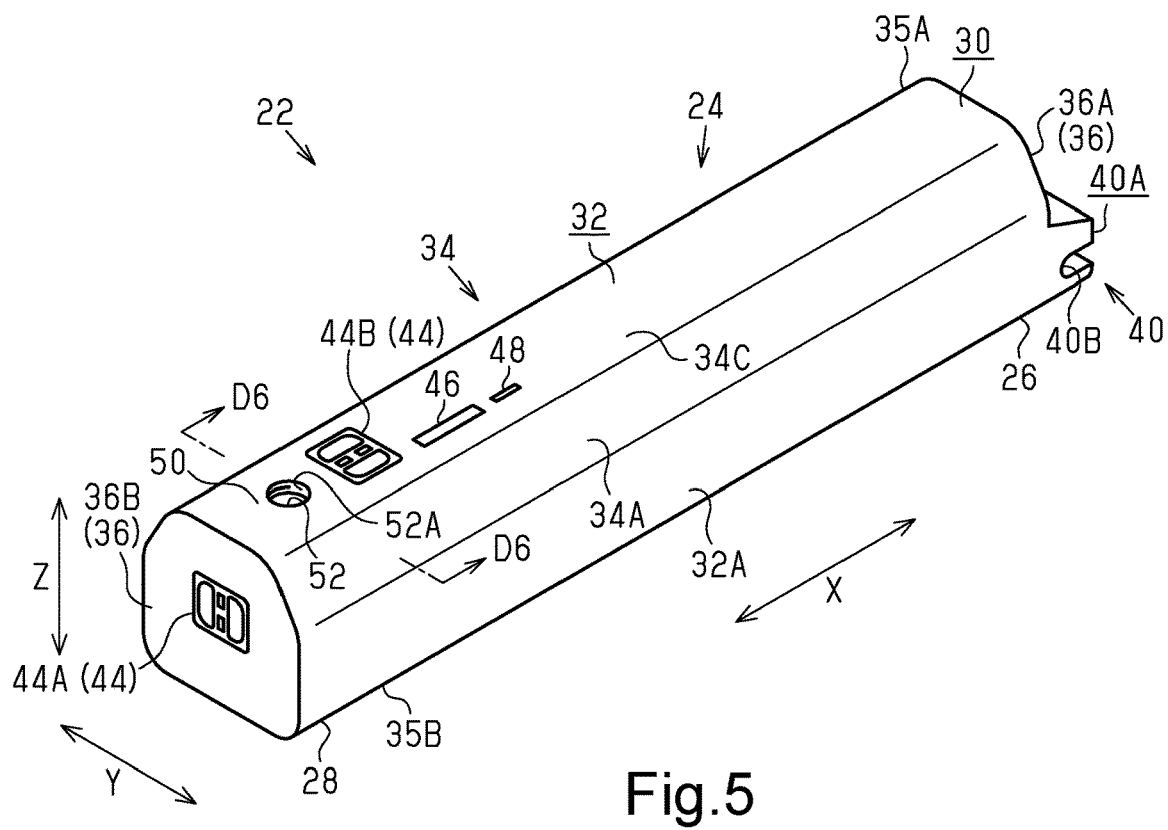
FIG. 5 is a perspective view of the battery pack shown in FIG. 3 as viewed from a direction that differs from that of FIG. 4.

As shown in FIG. 5, the battery pack 22 includes electric connectors 44, a display 46 and a switch 48. The display 46 is configured to show, for example, the battery level of the battery pack 22. The switch 48 is configured, for example, to switch the power of the battery pack 22 on and off. The display 46 and the switch 48 are provided on the housing 24. In the illustrated embodiment, the display 46 and the switch 48 are arranged in the fourth side surface 34 of the housing 24. The battery pack 22 can be configured without at least one of the display 46 and the switch 48.

The electric connectors 44 are provided on the housing 24. The electric connectors 44 are each electrically connectable to a plug P (refer to FIG. 11) that is further electrically connected to an electric component of the bicycle 10 (refer to FIG. 1). The electric connectors 44 include a first electric connector 44A and a second electric connector 44B. The first electric connector 44A is provided in, for example, the second end surface 36B of the housing 24. The second electric connector 44B is provided in the fourth side surface 34 of the housing 24 adjacent to the second end surface 36B. The second electric connector 44B can be provided in the first side surface 32A, the second side surface 32B (refer to FIG. 4), or the third side surface 32C of the housing 24 adjacent to the second end surface 36B. Connection of the plug P to one of the electric connectors 44A and 44B allow the battery pack 22 to supply the electric component with power. The electric connectors 44 can be configured without one of the first electric connector 44A and the second electric connector 44B. The electric connectors 44 are configured to be connectable to a charger so that the battery cells can be charged via the electric connectors 44.

Figure 6:
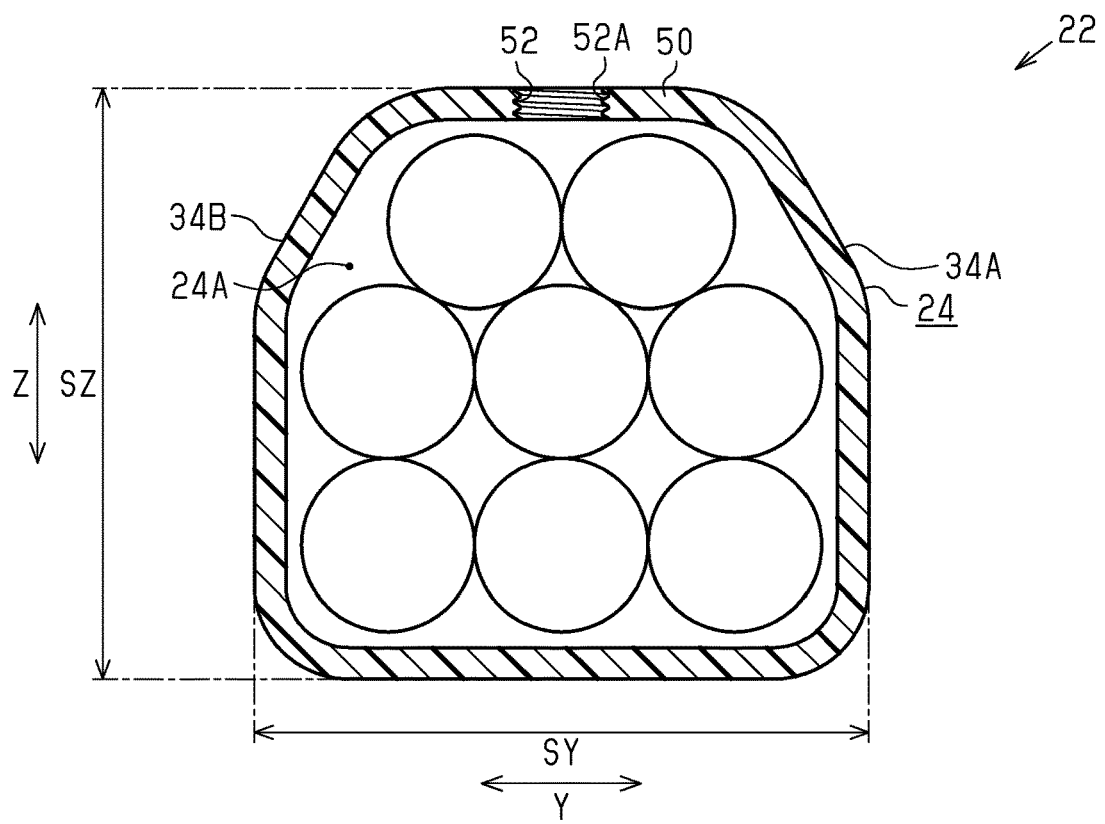
FIG. 6 is a cross-sectional view of the battery pack taken along section line D6-D6 in FIG. 5.

As shown in FIGS. 2 and 6, the battery cells 38 are accommodated in the accommodation compartment 24A of the housing 24. The maximum number of the battery cells 38 that can be accommodated in the accommodation compartment 24A of the housing 24 is correlated with the volume of the accommodation compartment 24A. The maximum number of the battery cells 38 that can be accommodated in the accommodation compartment 24A of the housing 24 will hereafter be referred to as "the maximum number of the battery cells 38." More specifically, the maximum number of the battery cells 38 is determined by a first dimension SX (refer to FIG. 2) in the first direction X of the housing 24, a second dimension SY (refer to FIG. 6) in the second direction Y of the housing 24, and a third dimension SZ (refer to FIG. 6) in the third direction Z of the housing 24. The second dimension SY and the third dimension SZ can be freely changed within a range that allows the battery pack 22 to be fitted in the accommodation compartment 62A of the shell 62 (refer to FIG. 3). In one embodiment, the battery attachment portion 60 allows for selective attachment of a plurality of battery packs 22 that differ from one another in at least one of the second dimension SY and the third dimension SZ and are designed to be within a range allowing for fitting in the accommodation compartment 62A.

Figure 7:
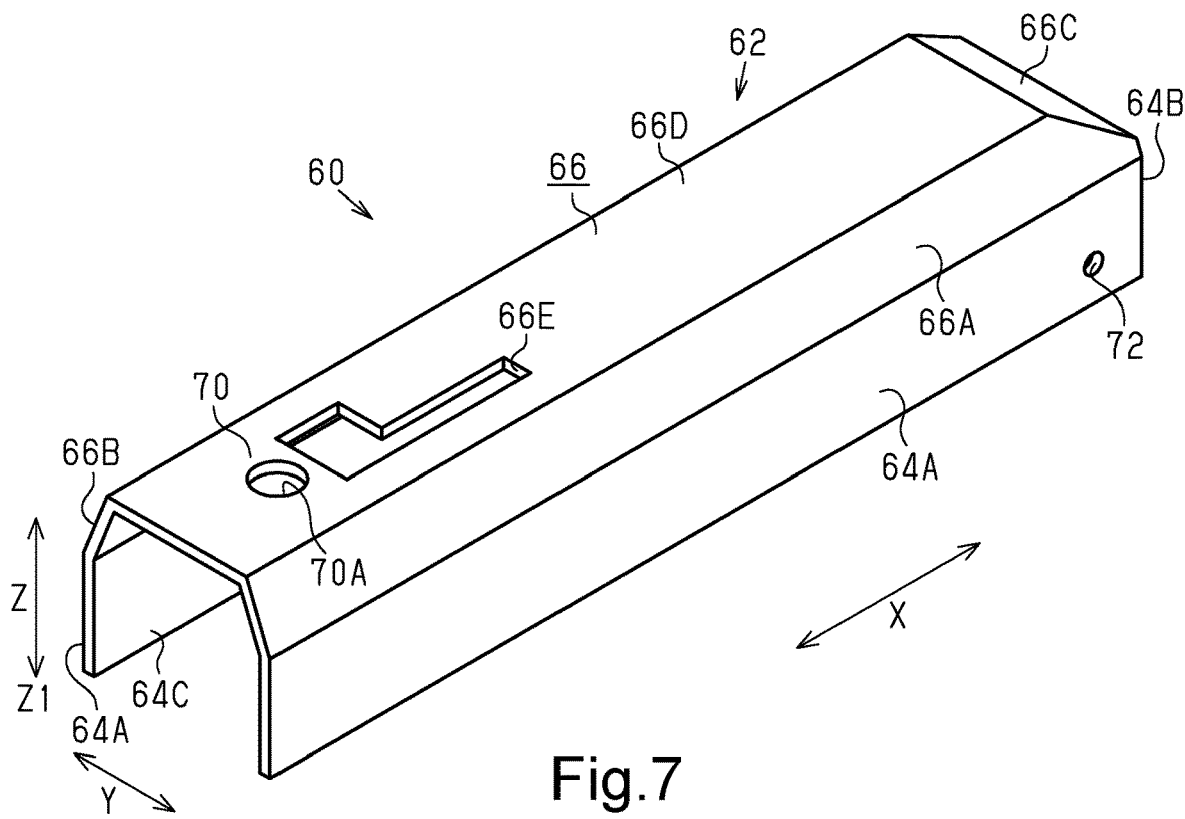
FIG. 7 is a perspective view of a battery attachment portion of the attachment structure shown in FIG. 3.

FIG. 7 shows the battery attachment portion 60 without the battery pack 22. It is preferred that the outer shape of the shell 62 be designed in any manner in conformance with the bicycle 10 (refer to FIG. 1). The shell 62 is formed to have a generally U-shaped cross section in a direction orthogonal to the first direction X. The main wall 66 includes a first inclined surface 66A, a second inclined surface 66B, a third inclined surface 66C and an intermediate surface 66D. The first inclined surface 66A, the second inclined surface 66B, the third inclined surface 66C and the intermediate surface 66D are each flat. The inclined surfaces 66A to 66C are each inclined relative to the intermediate surface 66D. The intermediate surface 66D is arranged between the first inclined surface 66A and the second inclined surface 66B in the second direction Y. The first inclined surface 66A extends toward one side Z1 in the third direction Z from one end of the intermediate surface 66D in the second direction Y and is continuous with one of the side walls 64A. The second inclined surface 66B extends toward one side Z1 in the third direction Z from the other end of the intermediate surface 66D in the second direction Y and is continuous with the other one of the side walls 64A. The third inclined surface 66C extends toward one size Z1 in the third direction Z from one end of the intermediate surface 66D in the first direction X and is continuous with the first inclined surface 66A, the second inclined surface 66B and the end surface 64B.

The battery attachment portion 60 further includes a second opening 66E. The second electric connector 44B, the display 46, and the switch 48 are exposed from the second opening 66E (refer to FIG. 11) in a state in which the battery pack 22 is attached to the battery attachment portion 60. The second opening 66E is provided in, for example, the main wall 66 of the shell 62. In one embodiment, the second opening 66E is provided in the intermediate surface 66D of the main wall 66. The position of the second opening 66E in the shell 62 is determined by the layout of the second electric connector 44B, the display 46 and the switch 48 that are provided on the battery pack. In one embodiment, in a case where the second electric connector 44B, the display 46 and the switch 48 are provided on one of the first side surface 32A and the second side surface 32B of the battery pack 22, the second opening 66E is provided in the corresponding one of the side surfaces 32A and 32B of the shell 62. The second opening 66E can be provided for each of the second electric connector 44B, the display 46 and the switch 48. The battery attachment portion 60 can be configured without the second opening 66E.

Figure 8:
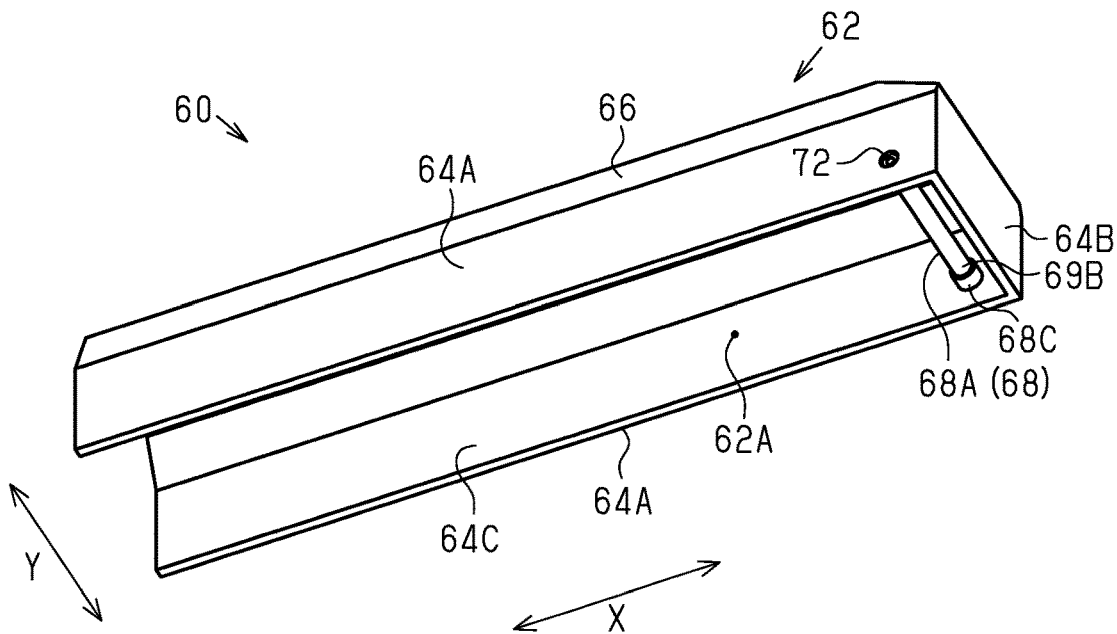
FIG. 8 is a perspective view of the battery attachment portion of the attachment structure as viewed from a direction that differs from that of FIG. 7.

FIG. 8 shows the structure of the first engagement portion 68 of the battery attachment portion 60. The first engagement portion 68 includes, for example, a projection that is fitted into the first groove 40A of the second engagement portion 40 (refer to FIG. 4). Preferably, in a state in which the projection is fitted into the first groove 40A, the projection contacts the second engagement portion 40 at least at two locations that are spaced apart in the second direction Y. The projection of the first engagement portion 68 includes a rod 68A. Preferably, the rod 68A is cylindrical. The rod 68A of the first engagement portion 68 extends in the second direction Y in the accommodation compartment 62A of the shell 62. The first engagement portion 68 can be configured as one element of the battery pack assembly 20.

The first groove 40A has a depth in the first direction X that is greater than the diameter of the rod 68A of the first engagement portion 68. This restricts separation of the second engagement portion 40 from the first engagement portion 68 if the battery pack 22 moves in the first direction X in a state in which the second engagement portion 40 is engaged with the first engagement portion 68. The first groove 40A has a dimension in the third direction Z that is substantially the same as the diameter of the rod 68A of the first engagement portion 68 or slightly larger than the diameter of the rod 68A. In a state in which the first engagement portion 68 and the second engagement portion 40 are engaged, an elastic member can be arranged on or in at least one of the first engagement portion 68 and the second engagement portion 40 to be located between the first engagement portion 68 and the second engagement portion 40. The elastic member includes, for example, rubber or urethane. The first groove 40A opens toward one side Z1 in the third direction Z.

The battery attachment portion 60 further includes two support holes 72. The two support holes 72 allow for the insertion of the rod 68A of the first engagement portion 68. The two support holes 72 are provided in, for example, portions faced toward each other in the two side walls 64A of the shell 62. Preferably, the first groove 40A has a width in the second direction Y that is substantially the same as an axial dimension of a portion of the rod 68A that is located in the accommodation compartment 62A. The support holes 72 extend through the side walls 64A in the second direction Y. The rod 68A of the first engagement portion 68 includes, for example, one end 69A in the axial direction that defines a threaded section 68B (refer to FIG. 3). The surface in the side wall 64A including the one of the support holes 72 that corresponds to the threaded section 68B of the first engagement portion 68 is threaded (not shown) and connectable to the threaded section 68B of the first engagement portion 68. Preferably, the rod 68A of the first engagement portion 68 includes, for example, another end 69B in the axial direction and a flange 68C extending from the end 69B and having a larger diameter than the support holes 72. The flange 68C contacts the battery attachment portion 60 from an outer side and positions the rod 68A of the first engagement portion 68 in the second direction Y.

One end 69A of the rod 68A of the first engagement portion 68 is supported by one of the support holes 72. The other end 69B of the rod 68A of the first engagement portion 68 is supported by the other one of the support holes 72. Preferably, the other end 69B or the flange 68C of the rod 68A of the first engagement portion 68 includes an engagement section that is engageable with a tool used to rotate the rod 68A about its axis. The rod 68A of the first engagement portion 68 is inserted into the two support holes 72 in the second direction Y, and the threaded section 68B is joined with the threaded section of one of the support holes 72 to fix the rod 68A to the shell 62. Preferably, the rod 68A of the first engagement portion 68 is attached in a non-removable manner to the shell 62 through swaging, adhering, welding, or the like.

The rod 68A of the first engagement portion 68 can be configured without at least one of the threaded section 68B and the flange 68C. In a case where the rod 68A of the first engagement portion 68 does not include the threaded section 68B, the end 69A of the rod 68A of the first engagement portion 68 can be press-fitted into one of the support holes 72 and fixed to the battery attachment portion 60. Alternatively, the end 69A can be adhered or welded and fixed to the battery attachment portion 60 in a state inserted in the support holes 72. The other end 69B of the rod 68A of the first engagement portion 68 can be press-fitted into the other one of the support holes 72 and fixed to the battery attachment portion 60. Alternatively, the end 69B can be adhered or welded and fixed to the battery attachment portion 60 in a state inserted into the other one of support holes 72. In the illustrated embodiment, the rod 68A of the first engagement portion 68 is configured so as not to project out of the side walls 64A of the shell 62 in a state inserted into the support holes 72. One of the support holes 72 can be configured by a blind hole that is continuous with the accommodation compartment 62A.

The housing 24 of the battery pack 22 includes a second threaded portion 52 used to attach the attachment member 80. The housing 24 includes a first housing portion 50. The second threaded portion 52 is included in the first housing portion 50. The first housing portion 50 is defined by the portion of the housing 24 that forms the intermediate surface 34C. The second threaded portion 52 includes a threaded hole 52A that extends through the first housing portion 50 in the third direction Z. The battery attachment portion 60 that is provided on the frame 12 further includes a first frame portion 70. The first frame portion 70 is defined by the main wall 66. The first frame portion 70 includes a hole 70A through which the attachment member 80 is inserted. The hole 70A allows for the insertion of the attachment member 80. The hole 70A is provided in the shell 62 at a position corresponding to the second threaded portion 52 of the first housing portion 50 in a state in which the battery pack 22 is accommodated in the accommodation compartment 62A of the shell 62. The hole 70A extends through the main wall 66 in the third direction Z. The threaded hole 52A does not have to extend through the first housing portion 50. In such a case, for example, the first housing portion 50 includes a groove, and the threaded hole 52A is formed at the open side of the groove. Preferably, the space near the bottom of the groove at the opposite side of the opening has a larger diameter than the threaded hole 52A. In this case, the groove can have a diameter that is fixed from the opening toward the bottom in the housing 24, and a member including the threaded hole 52A can be attached to the groove to form the first housing portion 50.

Figure 12:
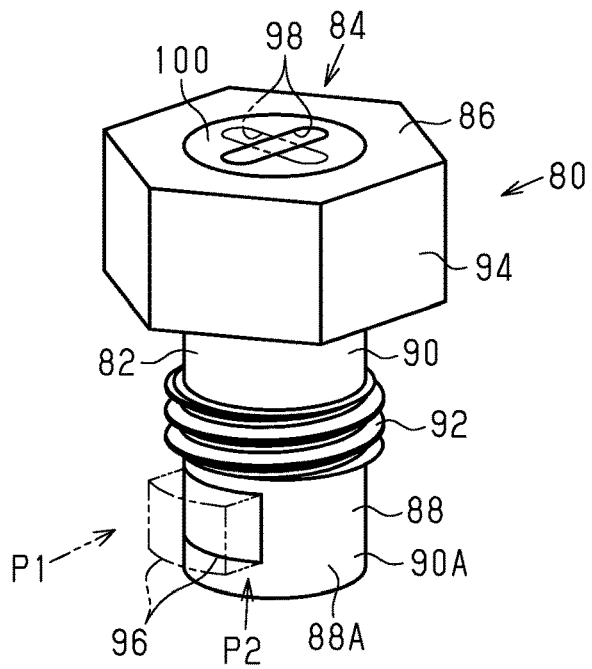
FIG. 12 is a perspective view of an attachment member of the attachment structure shown in FIG. 3.
Figure 13:
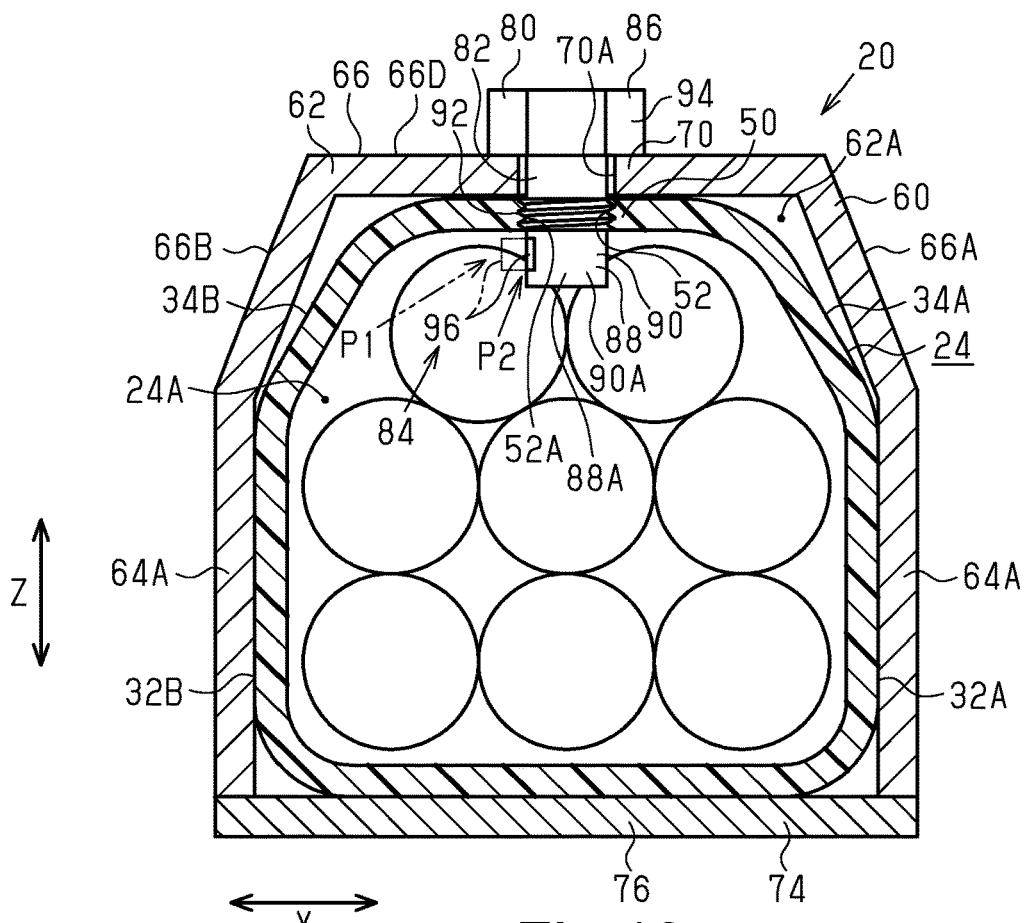
FIG. 13 is a cross-sectional view of the battery pack assembly taken along line section D13-D13 in FIG. 11.

As shown in FIGS. 12 and 13, the attachment member 80 is used to attach the battery pack 22 to the frame 12 of the bicycle 10. The attachment member 80 includes a coupling member 82 and a lock 84. The attachment member 80 further includes an engagement portion 86.

The coupling member 82 includes a first rod 88. The first rod 88 includes an outer circumference 90 and a first threaded portion 92 defined by at least part of the outer circumference 90. In a state in which the battery pack 22 is arranged in the frame 12, the coupling member 82 is inserted through the first frame portion 70 of the frame 12 and coupled to the first housing portion 50 to restrict movement of the battery pack 22 relative to the frame 12. The first threaded portion 92 is joined with the second threaded portion 52 in the first housing portion 50 so that the coupling member 82 restricts movement of the battery pack 22 relative to the frame 12. The first threaded portion 92 is provided in an axially intermediate portion of the first rod 88. The first threaded portion 92 can extend in the axial direction over the entire first rod 88 excluding a region that defines a restriction portion 94. Alternatively, the first threaded portion 92 can extend in the axial direction over the entire length of the first rod 88 excluding regions including the restriction portion 94 and a movable portion 96 of the lock 84. In the present embodiment, the first threaded portion 92 extends over the first rod 88 in the axial direction at regions excluding a first end 88A, which is located at the side of the first rod 88 opposite to the restriction portion 94, and a portion adjacent to the restriction portion 94. In a case in which the threaded hole 52A of the first housing portion 50 does not extend through the first housing portion 50 and is formed as a recess in the first housing portion 50, the first end 88A of the first rod 88 is received in a space located toward the bottom of the recess at the side opposite to the opening of the recess.

The coupling member 82 further includes the restriction portion 94 that contacts the first frame portion 70 and restricts movement of the first rod 88 toward one side in the axial direction. The restriction portion 94 is provided on one axial end of the first rod 88. The restriction portion 94 extends from the outer circumference 90 of the first rod 88 in the radial direction of the first rod 88. The restriction portion 94 has a larger outer diameter than the first rod 88. The outer diameter of the restriction portion 94 is larger than the inner diameter of the hole 70A in the first frame portion 70. Thus, the contact of the restriction portion 94 with the surface around the hole 70A restricts movement of the restriction portion 94 toward the accommodation compartment 24A.

The engagement portion 86 is provided on the restriction portion 94 and engageable with a tool (not shown) used to rotate the first threaded portion 92. In one embodiment, the engagement portion 86 includes a polygonal bolt head formed by the outer part of the restriction portion 94. In this case, the tool includes a wrench or spanner. A person uses the tool to fasten the first threaded portion 92 to the second threaded portion 52 and attach the battery pack 22 to the frame 12 with the coupling member 82. The coupling member 82 restricts relative movement of the frame 12 and the battery pack 22 while the attachment member 80 is in an attachment state in which the battery pack 22 is attached to the frame 12.

The lock 84 is provided on the coupling member 82. The lock 84 is provided on the first rod 88. The lock 84 includes the movable portion 96, an insertion hole 98 and a key cylinder 100. The lock 84 is configured to be switchable between a restriction state in which the lock 84 restricts movement of the coupling member 82 relative to the housing 24 and the frame 12 while the attachment member 80 is in an attachment state in which the battery pack is attached to the frame, and a release state in which the lock 84 permits movement of the coupling member 82 relative to the housing 24 and the frame 12 while the attachment member 80 is in the attachment state.

The movable portion 96 is provided on the first rod 88. The movable portion 96 projects out of the outer circumferential surface 90A of the first rod 88. The movable portion 96 is movable between a first position P1, at which the movable portion 96 in the restriction state can contact at least one of the frame 12 and the battery pack 22 from the other side in the axial direction, and a second position P2, at which the movable portion 96 in the release state cannot contact the frame 12 and the battery pack 22 from the other side in the axial direction. The movable portion 96 is movable between the first position P1, at which the movable portion 96 projects outward in the radial direction of the first rod 88 from the outer circumference 90 of the first rod 88, and the second position P2, at which the movable portion 96 is retracted from the first position P1 toward the outer circumference 90 of the first rod 88. The movable portion 96 shown by the solid lines in FIGS. 12 and 13 is located at the second position P2. The movable portion 96 shown by the double-dashed lines in FIGS. 12 and 13 is located at the first position P1. The lock 84 moves the movable portion 96 between the first position P1 and the second position P2.

In a case where the movable portion 96 is located at the first position P1, the movable portion 96 projects out of the outer circumferential surface 90A of the first rod 88. In a case where the movable portion 96 is located at the second position P2, the movable portion 96 does not project out of the outer circumferential surface 90A of the first rod 88. In a further embodiment, the projection amount of the movable portion 96 from the outer circumferential surface 90A of the first rod 88 in a case where the movable portion 96 is located at the second position P2 is smaller than the projection amount of the movable portion 96 from the outer circumferential surface 90A of the first rod 88 in a case where the movable portion 96 is located at the first position P1. In this case, the hole 70A of the first frame portion 70 and the second threaded portion 52 of the first housing portion 50 each have an inner diameter that allows the movable portion 96 to move at the second position P2.

In a case where the movable portion 96 is located at the second position P2 in a state in which the coupling member 82 is inserted into the hole 70A of the first frame portion 70 and the threaded hole 52A of the first housing portion 50, the maximum outer diameter where the movable portion 96 is located is smaller than the minimum inner diameter of each of the hole 70A of the first frame portion 70 and the threaded hole 52A of the first housing portion 50. Thus, in a case where force is applied to the attachment member 80 from the first housing portion 50 toward the first frame portion 70, the coupling member 82 can move outward from the frame 12 without the movable portion 96 contacting the inner surface of the first housing portion 50. In a case where the movable portion 96 is located at the first position P1 in a state in which the coupling member 82 is inserted into the hole 70A of the first frame portion 70 and the threaded hole 52A of the first housing portion 50, the maximum outer diameter where the movable portion 96 is located is larger than the minimum inner diameter of each of the hole 70A of the first frame portion 70 and the threaded hole 52A of the first housing portion 50. Thus, in a case where force is applied to the attachment member 80 from the first housing portion 50 toward the first frame portion 70, the contact of the movable portion 96 and the first housing portion 50 restricts outward movement of the attachment member 80 from the frame 12.

The insertion hole 98 is exposed from the end surface of the restriction portion 94 and allows for the insertion of a key (not shown). The insertion hole 98 is connected to the key cylinder 100. The key cylinder 100 is operated by a key to move the movable portion 96. The key is inserted into the insertion hole 98, and is rotated about the axis of the key cylinder 100 to rotate the key cylinder 100 and move the movable portion 96 between the first position P1 and the second position P2.

Figure 9:
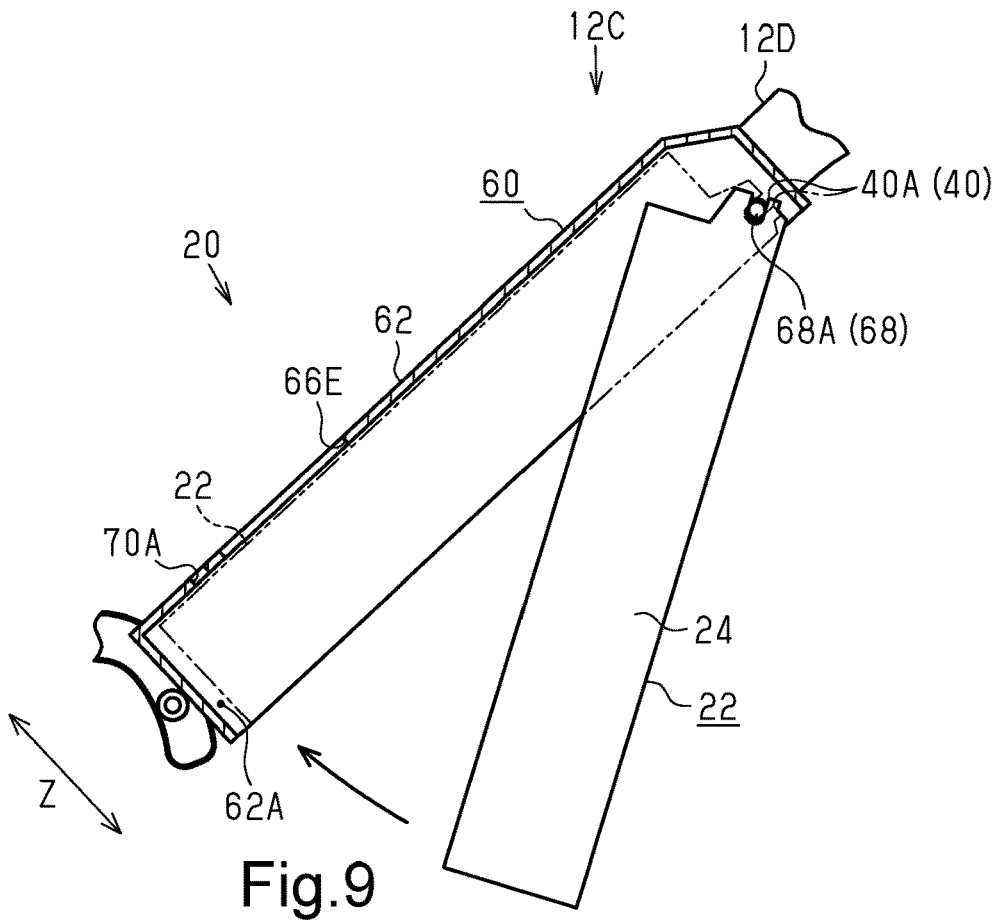
FIG. 9 is a cross-sectional view of the battery attachment portion of the attachment structure illustrating one example of a procedure for attaching the battery pack shown in FIG. 3.
Figure 10:
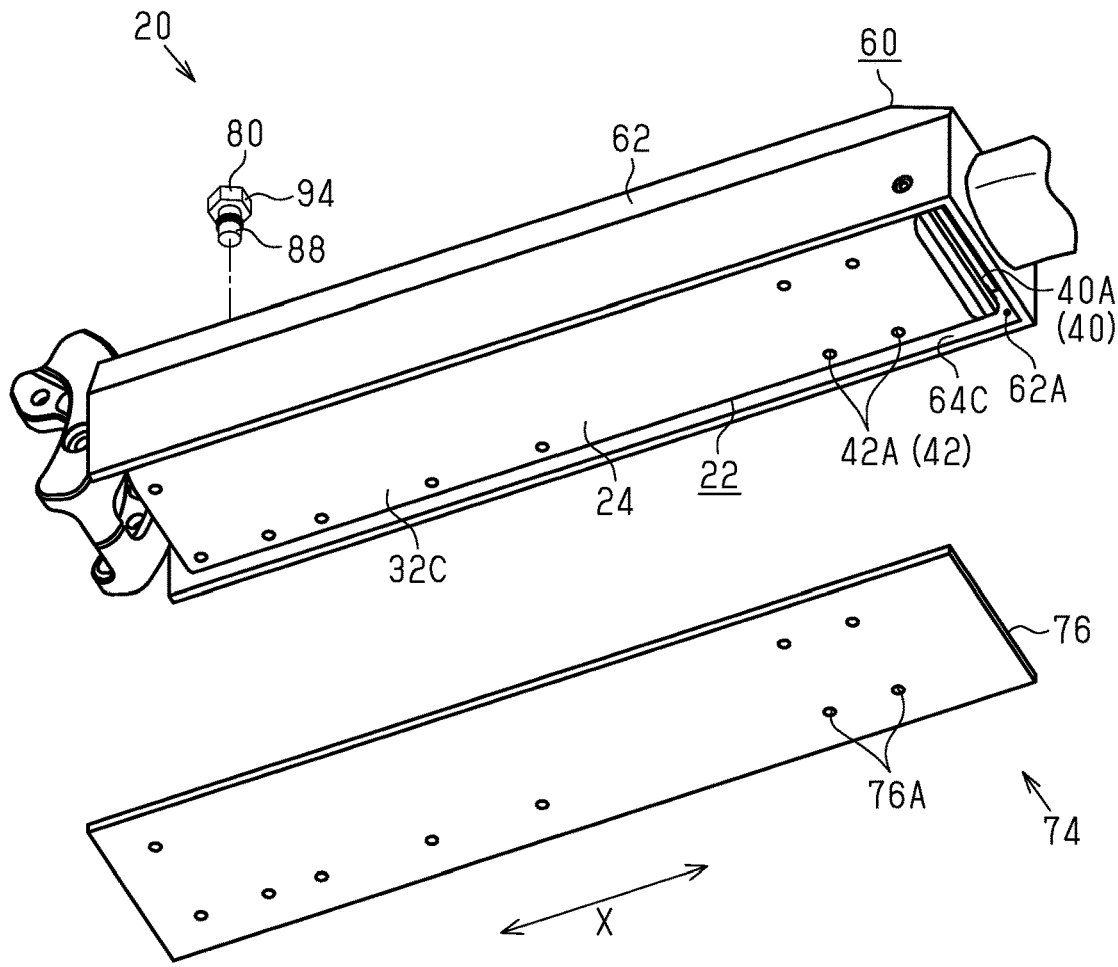
FIG. 10 is an exploded perspective view of the battery pack assembly showing a state in which a portion of the attachment structure for the battery pack shown in FIG. 1 is dismantled.
Figure 11:
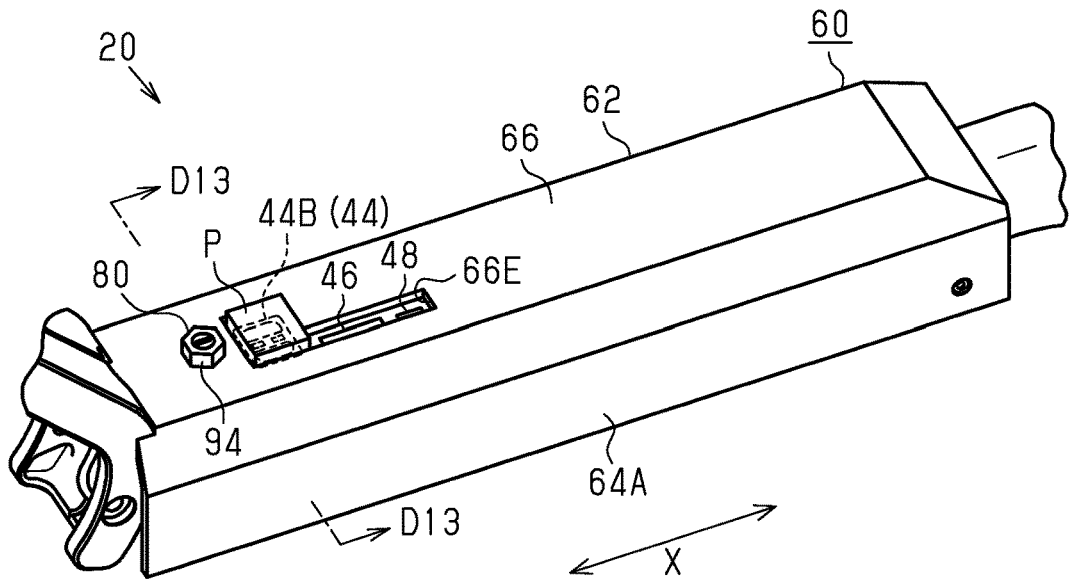
FIG. 11 is a perspective view of the battery pack assembly showing an outer appearance of the attachment structure for the battery pack shown in FIG. 1 as viewed from a direction that differs from that of FIG. 10.

With reference to FIGS. 9 to 11, the procedures for attaching the battery pack 22 to the battery attachment portion 60 will now be described. FIG. 9 is a cross-sectional view of the battery pack assembly 20 taken along the first direction X.

The battery pack 22 is attached to the battery attachment portion 60 through, for example, the following procedures. Referring to FIG. 9, in a first procedure, a user fits the second engagement portion 40 of the battery pack 22 into the first engagement portion 68 of the battery attachment portion 60 and pivots the battery pack 22 about the first engagement portion 68. More specifically, the user fits the first groove 40A of the second engagement portion 40 onto the rod 68A of the first engagement portion 68 and pivots the battery pack 22 about the rod 68A of the first engagement portion 68 to arrange the battery pack 22 in the accommodation compartment 62A of the shell 62. Instead of the first procedure, the user can arrange the battery pack 22 in the accommodation compartment 62A of the shell 62 and then slide the battery pack 22 in the first direction X to engage the second engagement portion 40 with the first engagement portion 68. In a state in which the battery pack 22 is accommodated in the accommodation compartment 62A of the shell 62, the first engagement portion 68 holds the second engagement portion 40 in place relative to the shell 62 in the third direction Z.

With reference to FIG. 10, in a second procedure, in a state in which the battery pack 22 is accommodated in the accommodation compartment 62A of the shell 62, the user inserts the first threaded portion 92 of the attachment member 80 into the hole 70A and joins the first threaded portion 92 with the second threaded portion 52 (refer to FIG. 13). In a third procedure, the user operates the key to move the movable portion 96 from the second position P2 to the first position P1. The plug P (refer to FIG. 11) is connected to one of the electric connectors 44 of the battery pack 22 before the second procedure, after the third procedure, or between the second and third procedures. In the illustrated embodiment, the plug P is connected to the second electric connector 44B. In a fourth procedure, the user attaches the cover 74 to the battery pack 22. Referring to FIG. 11, the procedures described above attaches the battery pack 22 (refer to FIG. 10) to the battery attachment portion 60. The fourth procedure can be performed before the first procedure.

Second Embodiment

Figure 14:
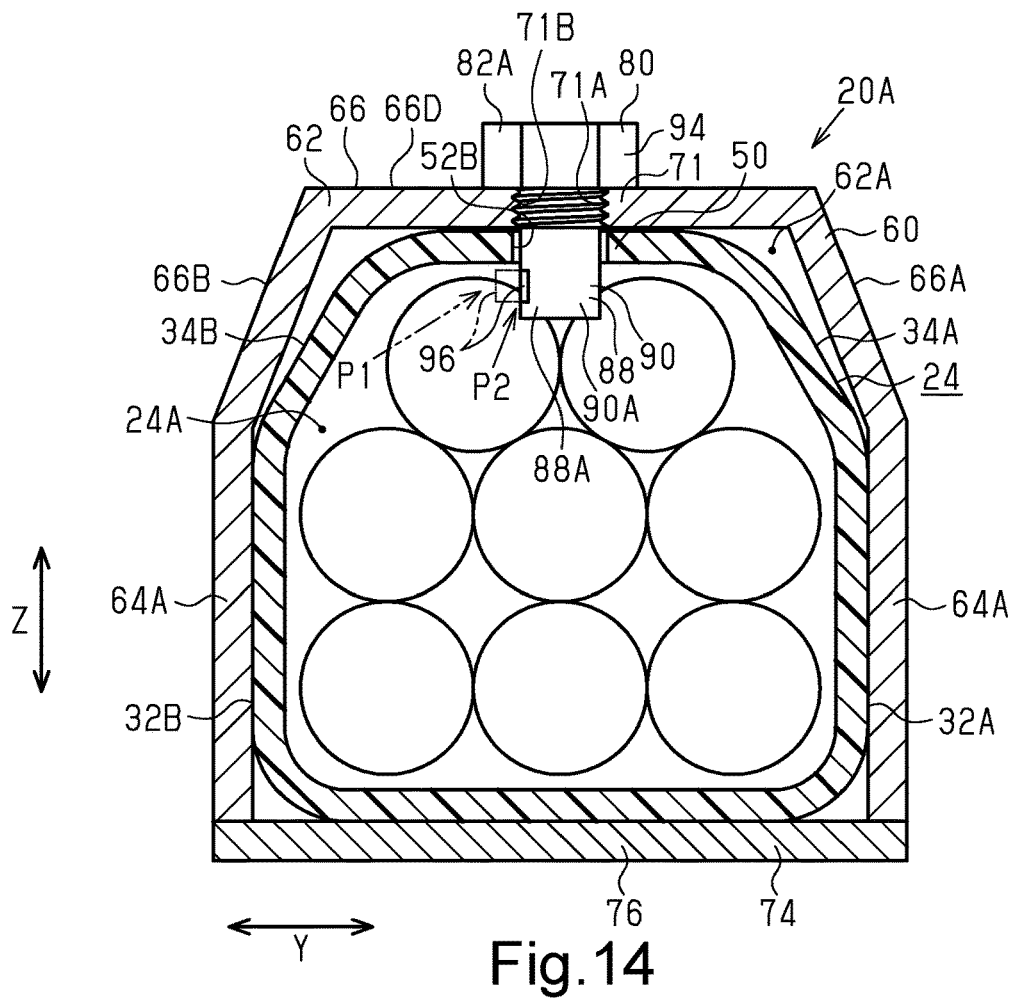
FIG. 14 is a cross-sectional view of a battery pack assembly in accordance with a second embodiment.

With reference to FIG. 14, a battery pack assembly 20A of a second embodiment will now be described. The battery pack assembly 20A of the second embodiment is similar to the battery pack assembly 20 of the first embodiment except in that the first threaded portion 92 of a coupling member 82A is joined with a third threaded portion 71A of a second frame portion 71. Same reference numerals are given to those components that are the same as the corresponding components of the first embodiment. Such components will not be described in detail.

The first housing portion 50 of the battery pack assembly 20A includes a hole 52B. The frame 12 of the battery pack assembly 20A includes the second frame portion 71. The second frame portion 71 is attached to the battery attachment portion 60 at a location corresponding to the first housing portion 50. The second frame portion 71 includes the third threaded portion 71A. The third threaded portion 71A includes a threaded hole 71B extending through the second frame portion 71 in the third direction Z.

The coupling member 82A is configured to be inserted through the hole 52B of the first housing portion 50. The hole 52B is equivalent to the threaded hole 52A (refer to FIG. 13) less the thread. The first threaded portion 92 is joined with the third threaded portion 71A so that the coupling member 82A restricts movement of the battery pack 22 relative to the frame 12 while the attachment member 80 is in an attachment state. In the present embodiment, the first threaded portion 92 is continuous with the restriction portion 94 in the axial direction of the first rod 88 and defined by the region of the first rod 88 excluding the first end 88A at the side opposite to the restriction portion 94. The hole 52B does not have to extend through the first housing portion 50. The first housing portion 50 can include a groove in which the coupling member 82A is at least partially received. One side of the groove is open and the opposite bottom side of the groove is closed. The diameter at the bottom side is larger than the diameter at the open side. In one embodiment, the first housing portion 50 can be provided on an end surface with respect to the first direction X, and the groove can be extended in the third direction Z. The bottom of the groove includes a recess or through hole to which the movable portion 96 is fitted.

Third Embodiment

Figure 15:
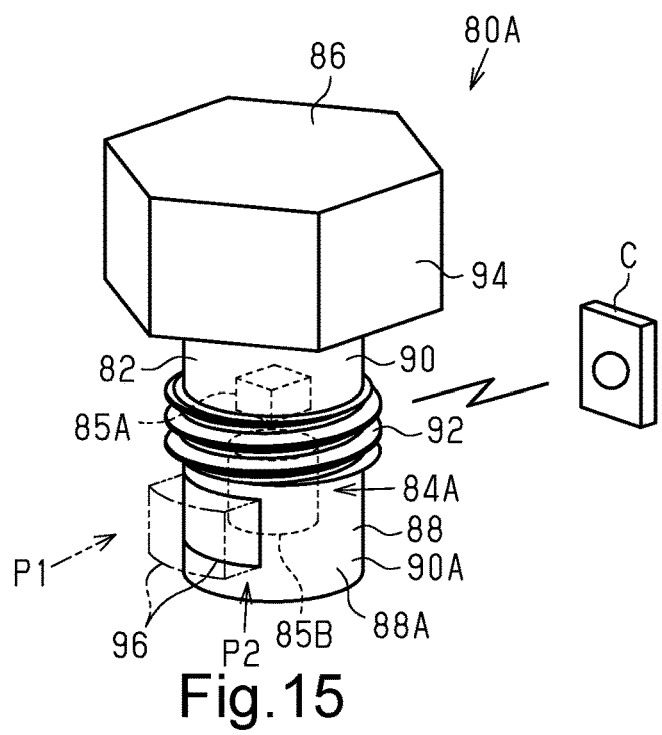
FIG. 15 is a perspective view of an attachment member in accordance with a third embodiment.

With reference to FIG. 15, an attachment member 80A of a third embodiment will now be described. The attachment member 80A of the third embodiment is similar to the attachment member 80 of the first embodiment except in that an electric lock 84A is incorporated. Same reference numerals are given to those components that are the same as the corresponding components of the first embodiment. Such components will not be described in detail.

The lock 84A is configured so that the movable portion 96 is moved by an external operation device C. The lock 84A includes the movable portion 96, an electronic controller 85A and an actuator 85B. Preferably, the lock 84A includes a power supply (not shown). The controller 85A is configured to communicate with the external operation device C. In one embodiment, the controller 85A includes a processor and a wireless communicator that performs wireless communication with the external operation device C. The controller 85A drives the actuator 85B based on a signal received from the external operation device C. Whenever driven, the actuator 85B moves the movable portion 96 between the first position P1 and the second position P2. The actuator 85B can be a rotation motor or a linear actuator.

Fourth Embodiment

Figure 16:
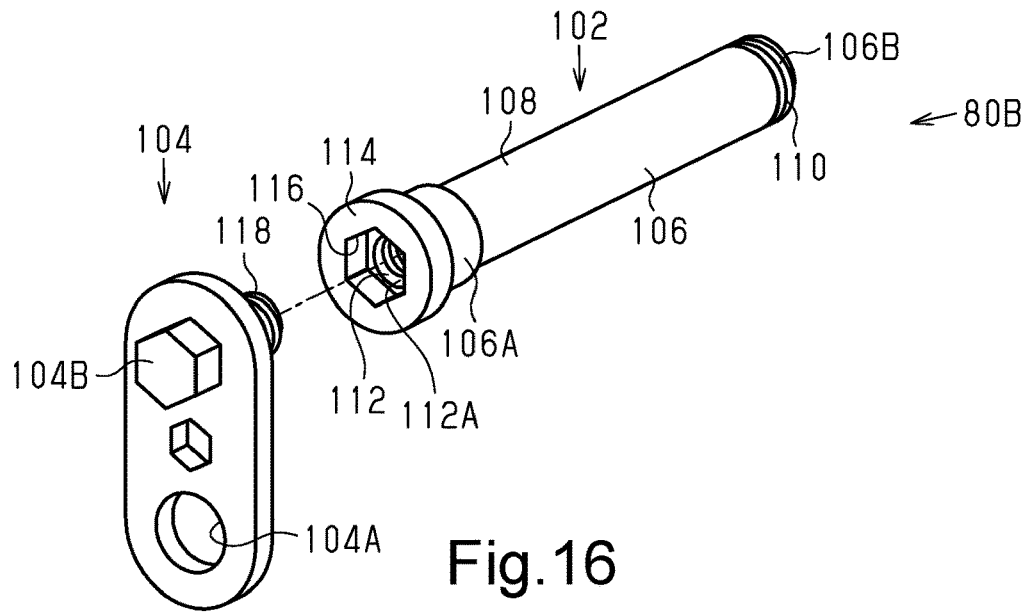
FIG. 16 is a perspective view of an attachment member in accordance with a fourth embodiment.
Figure 17:
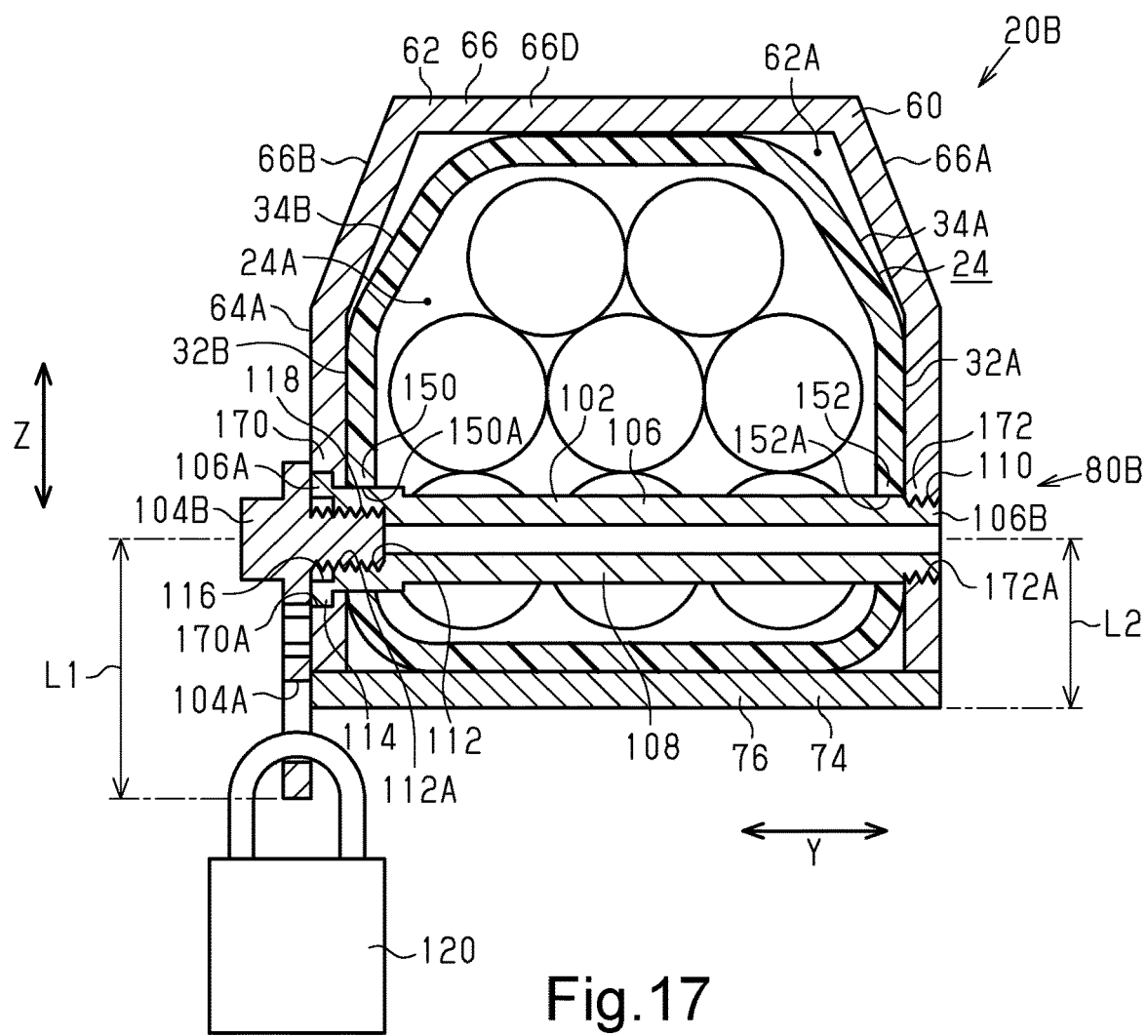
FIG. 17 is a cross-sectional view of a battery pack assembly in accordance with the fourth embodiment.
Figure 18:
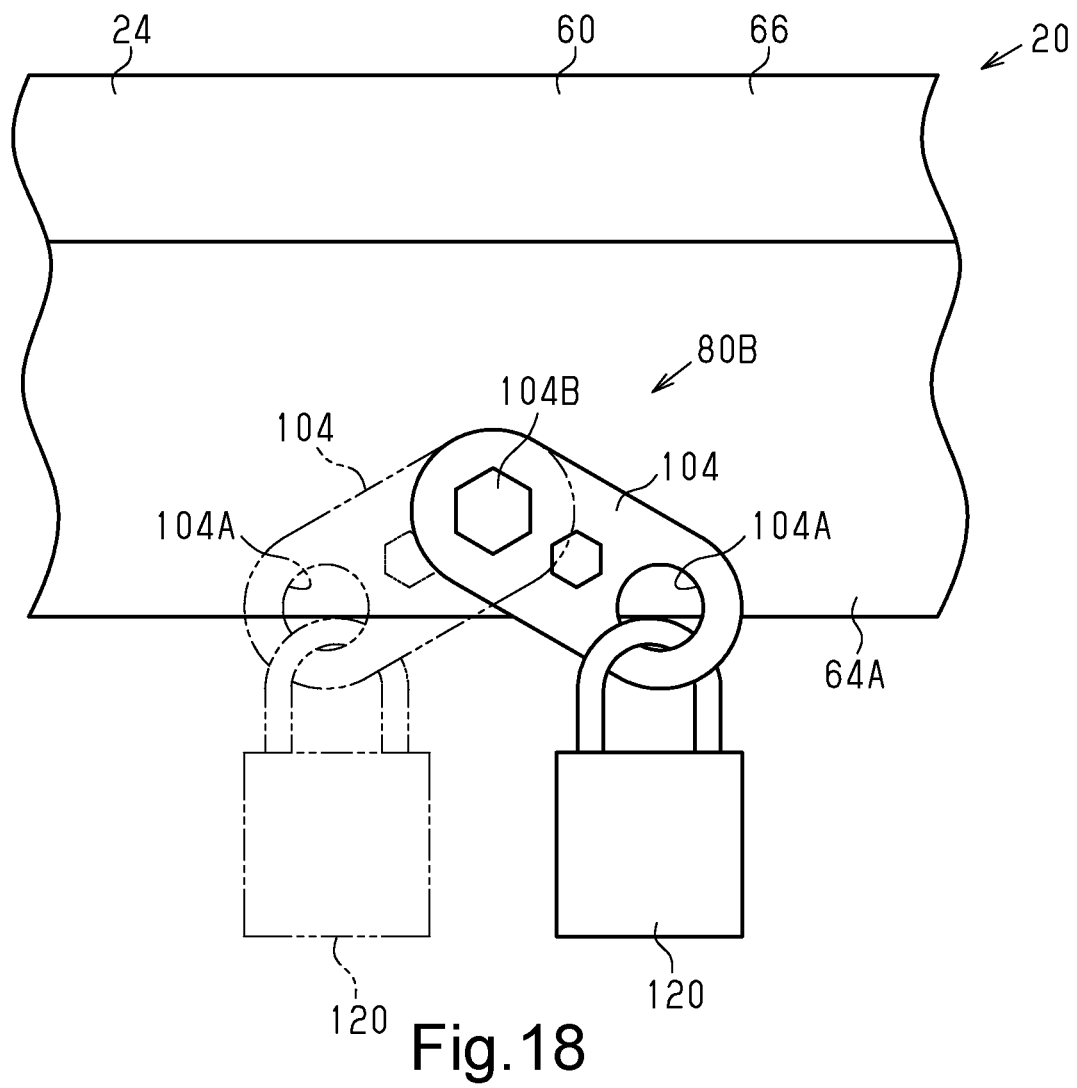
FIG. 18 is a partial side view of the battery pack assembly in accordance with the fourth embodiment.

With reference to FIGS. 16 to 18, a battery pack assembly 20B of a fourth embodiment will now be described. The battery pack assembly 20B of the fourth embodiment is similar to the battery pack assembly 20 of the first embodiment except in the structure of an attachment member 80B and the structure for attaching the attachment member 80B. Same reference numerals are given to those components that are the same as the corresponding components of the first embodiment. Such components will not be described in detail.

As shown in FIG. 16, the attachment member 80B includes a coupling member 102 and a lock attachment portion 104. The coupling member 102 includes a first rod 106. The first rod 106 includes an outer circumference 108 and a first threaded portion 110 defined by least part of the outer circumference 108. The coupling member 102 includes a first end 106A in the axial direction of the first rod 106 and a fourth threaded portion 112 in the first end 106A. In one embodiment, the fourth threaded portion 112 includes a female thread. Further, the first rod 106 includes a second end 106B in the axial direction where the first threaded portion 110 is formed. The first threaded portion 110 includes a male thread. The first rod 106 is hollow but can be solid.

As shown in FIG. 17, the battery attachment portion 60 of the frame 12 includes a first frame portion 170 and a second frame portion 172. The first frame portion 170 and the second frame portion 172 are respectively provided in the side walls 64A that are faced toward each other. The first frame portion 170 includes a hole 170A. The hole 170A extends through the first frame portion 170 in the Y direction. The second frame portion 172 includes a third threaded portion 172A. The third threaded portion 172A includes a female thread. The female thread of the third threaded portion 172A can extend through the second frame portion 172 in the Y direction or can be formed to open only at the side of the accommodation compartment 24A in the Y direction. The housing 24 includes first housing portions 150 and 152. The first housing portion 150 includes a hole 150A, and the first housing portion 152 includes a hole 152A. The first housing portion 150 is faced toward the first frame portion 170 in a state in which the battery pack 22 is attached to the frame 12. Further, the first housing portion 150 is included in the second side surface 32B. The first housing portion 152 is faced toward the second frame portion 172 in a state in which the battery pack 22 is attached to the frame 12. Further, the first housing portion 152 is included in the first side surface 32A.

The first end 106A of the coupling member 102 further includes a restriction portion 114 that contacts the first frame portion 170 and restricts movement of the first rod 106 toward one side in the axial direction. The restriction portion 114 is provided on one end of the first rod 106 in the axial direction and extends from the outer circumference of the first rod 106 in the radial direction of the first rod 106. The restriction portion 114 has a larger diameter than the portion of the first rod 106 at the side of the second end 106B. The outer diameter of the first rod 106 is larger than the minimum inner diameter of the hole 170A in the first frame portion 170 into which the first end 106A is inserted. When force is applied to the coupling member 102 from the side of the first end 106A toward the side of the second end 106B, contact of the restriction portion 114 and the first frame portion 170 restricts movement of the coupling member 102. The first end 106A of the coupling member 102 further includes a tool engagement portion 116 that is engageable with a predetermined tool used to operate the coupling member 102. In one embodiment, the tool engagement portion 116 includes a polygonal hole as viewed in the axial direction of the first rod 106. In this case, the predetermined tool includes a wrench. The tool engagement portion 116 is located toward the first end 106A from the fourth threaded portion 112 in the axial direction of the first rod 106. The hole of the tool engagement portion 116 is in communication with a threaded hole 112A of the fourth threaded portion 112.

In a state in which the battery pack 22 is arranged in the frame 12, the coupling member 102 is inserted through the first frame portion 170 of the frame 12 and coupled to the first housing portions 150 and 152 to restrict movement of the battery pack 22 relative to the frame 12. the coupling member 102 is configured to be inserted through the holes 150A and 152A in the first housing portions 150 and 152, and the first threaded portion 110 is joined with the third threaded portion 172A provided in the second frame portion 172 of the frame 12 to restrict movement of the battery pack 22 relative to the frame 12. More specifically, the first rod 106 is inserted through the hole 170A of the first frame portion 170, the hole 150A of the first housing portion 150, and the hole 152A of the first housing portion 152. Then, the first threaded portion 110 is fastened to the third threaded portion 172A of the second frame portion 172. This restricts movement of the battery pack 22 relative to the frame 12.

The lock attachment portion 104 is provided on the coupling member 102. The lock attachment portion 104 is formed separately from the coupling member 102. The lock attachment portion 104 can be coupled to the first end 106A of the first rod 106 in the axial direction of the coupling member 102. The lock attachment portion 104 includes a fifth threaded portion 118, a through hole 104A, and an operation portion 104B.

The lock attachment portion 104 has the form of a plate. The lock attachment portion 104 covers the tool engagement portion 116 in a state attached to the first end 106A of the coupling member 102 so that the predetermined tool cannot be engaged with the tool engagement portion 116. The lock attachment portion 104 extends from the first end 106A of the coupling member 102 in a direction intersecting the axial direction of the first rod 106. The lock attachment portion 104 extends toward the cover 74 from around the first end 106A in a direction intersecting the axial direction of the first rod 106. In the direction intersecting the axial direction of the first rod 106, the length L of the lock attachment portion 104 from the center axis of the first rod 106 to its end is greater than the length L2 from the hole 170A of the first frame portion 170 to the surface of the cover 74.

The fifth threaded portion 118 projects toward the first rod 106. In one embodiment, the fifth threaded portion 118 includes a male thread. The fifth threaded portion 118 can be coupled to the fourth threaded portion 112. The operation portion 104B projects toward the side opposite to the fifth threaded portion 118. The operation portion 104B functions as a wrench. The contour of the operation portion 104B is shaped in correspondence with the contour of the tool engagement portion 116. The operation portion 104B is engageable with the tool engagement portion 116. The first threaded portion 110 and the fifth threaded portion 118 are coaxially arranged and configured to be rotated in the same direction for loosening.

In a state in which the operation portion 104B of the lock attachment portion 104 is engaged with the tool engagement portion 116, a person rotates the lock attachment portion 104 to rotate the first rod 106 and fix the coupling member 102 to the frame 12. The lock attachment portion 104 is used as the predetermined tool that is engaged with the tool engagement portion 116. The person then removes the operation portion 104B from the tool engagement portion 116 and reverses the lock attachment portion 104 so that the surface of the lock attachment portion 104 on which the fifth threaded portion 118 is provided is directed toward the fourth threaded portion 112. The person then joins the fifth threaded portion 118 of the lock attachment portion 104 with the fourth threaded portion 112. In a further embodiment, a person can fix the coupling member 102 to the frame 12 in a state in which the fifth threaded portion 118 of the lock attachment portion 104 is coupled to the fourth threaded portion 112 of the coupling member 102. In this case, the lock attachment portion 104 functions as a predetermined tool, and the fourth threaded portion 112 functions as a tool engagement portion.

A lock 120 can be attached to the through hole 104A at a position separated from the first end 106A of the coupling member 102. In one embodiment, the lock 120 includes a padlock. In accordance with the attachment and removal of the lock 120, the lock attachment portion 104 is switchable between a restriction state in which the lock attachment portion 104 restricts movement of the coupling member 102 relative to the housing 24 and the frame 12 and a release state in which the lock attachment portion 104 allows movement of the coupling member 102 relative to the housing 24 and the frame 12.

With reference to FIGS. 17 and 18, the restriction state and the release state of the lock attachment portion 104 will now be described. In the restriction state, the lock 120 that is attached to the lock attachment portion 104 restricts rotation of the first rod 106. Referring to the solid lines and double-dashed lines in FIG. 18, in a case where the lock attachment portion 104 is rotated by a predetermined rotation amount in a state in which the lock 120 is attached to the lock attachment portion 104, the lock attachment portion 104 comes into contact with the side wall 64A of the battery attachment portion 60. This restricts further rotation of the lock attachment portion 104, and the lock attachment portion 104 cannot be removed from the coupling member 102.

In the release state, the lock 120 is removed from the lock attachment portion 104 to permit rotation of the first rod 106. More specifically, in a state in which the lock 120 is removed from the lock attachment portion 104, the lock attachment portion 104 is allowed to rotate beyond the positions illustrated by the solid lines and double-dashed lines in FIG. 18. Thus, the lock attachment portion 104 can be rotated to separate the fifth threaded portion 118 from the fourth threaded portion 112 and remove the lock attachment portion 104 from the coupling member 102. In a state in which the lock attachment portion 104 is removed from the coupling member 102, the tool engagement portion 116 of the coupling member 102 is exposed to the outside. Thus, a tool can be engaged with the tool engagement portion 116 to remove the coupling member 102 from the battery pack 22 and the frame 12.

Fifth Embodiment

Figure 19:
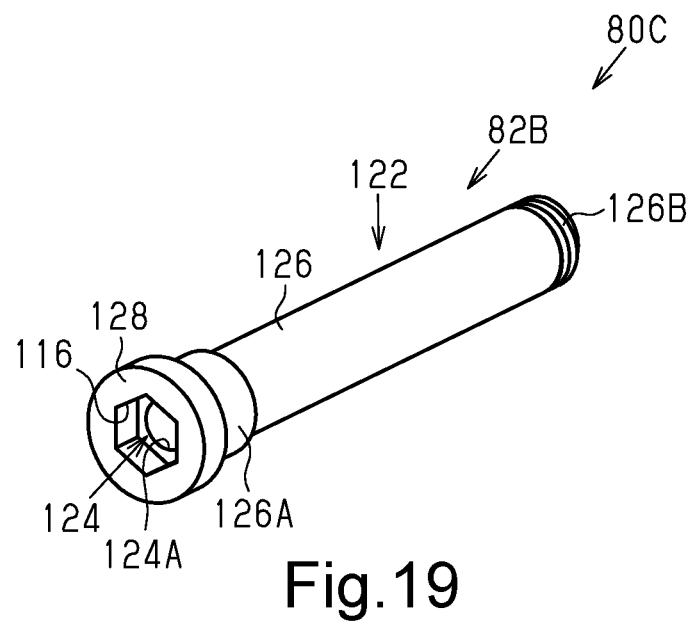
FIG. 19 is a perspective view of an attachment member in accordance with a fifth embodiment.
Figure 20:
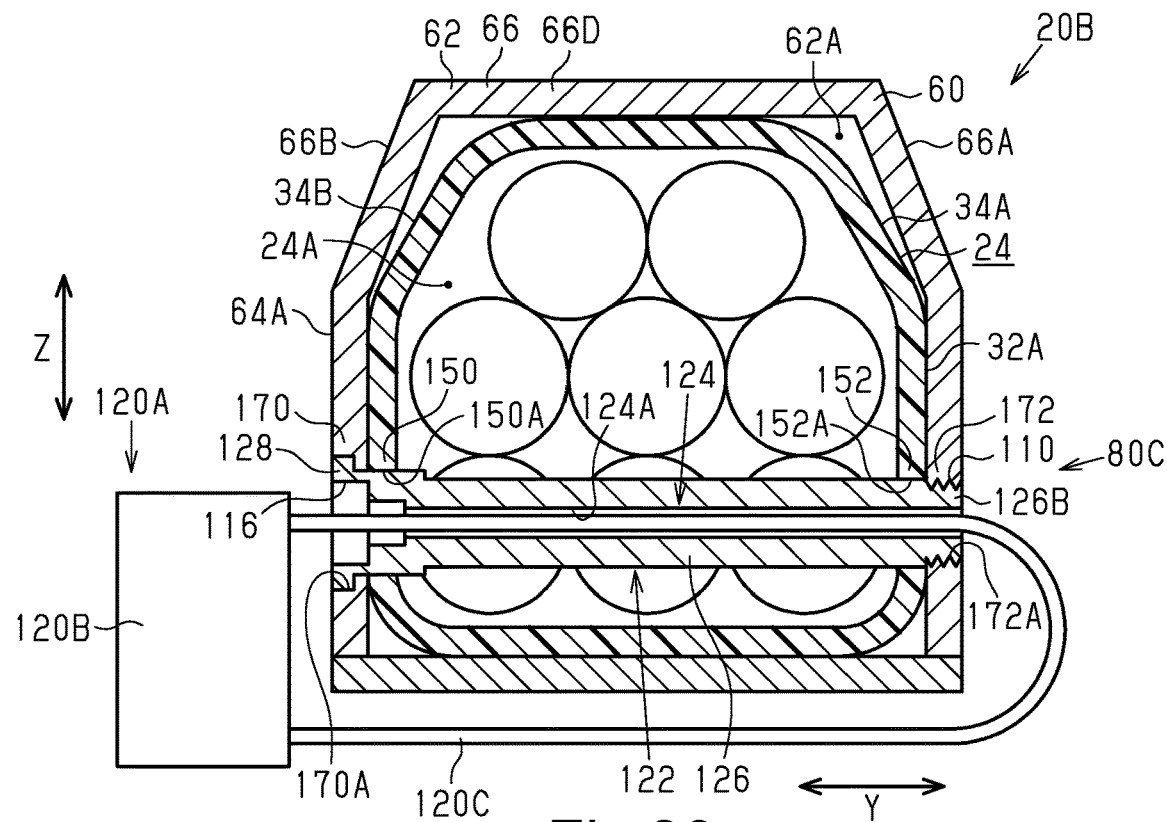
FIG. 20 is a cross-sectional view of a battery pack assembly in accordance with a fifth embodiment.

With reference to FIGS. 19 and 20, an attachment member 80C of the fifth embodiment will now be described. The attachment member 80C of the fifth embodiment is similar to the attachment member 80B of the fourth embodiment except in the structure of a lock attachment portion 124. Same reference numerals are given to those components that are the same as the corresponding components of the first embodiment. Such components will not be described in detail.

As shown in FIG. 19, a coupling member 82B includes a coupling member 122 and the lock attachment portion 124. The coupling member 122 includes a first rod 126, a restriction portion 128, a first end 126A, and a second end 126B. The first end 126A of the coupling member 122 includes the tool engagement portion 116 that is engageable with a predetermined tool (not shown) to operate the coupling member 122.

As shown in FIG. 20, the restriction portion 128 is provided on the first end 126A in the axial direction of the first rod 126. The restriction portion 128 contacts the first frame portion 170 and restricts movement of the first rod 126 toward one side in the axial direction while the attachment member 80C is in an attachment state. The third threaded portion 172A extends through the second frame portion 172. The second end 126B includes the first threaded portion 110. In a state in which the first threaded portion 110 is joined with the third threaded portion 172A, the second end 126B extends through the second frame portion 172 of the frame 12.

The lock attachment portion 124 includes a first through hole 124A that extends through the coupling member 122 in the axial direction of the first rod 126. The first through hole 124A extends through the frame 12 in the second direction Y in a state in which the first rod 126 is inserted through the hole 170A of the first frame portion 170, the hole 150A of the first housing portion 150, and the hole 152A of the first housing portion 152, and the first threaded portion 110 is fastened to the third threaded portion 172A of the second frame portion 172.

A lock 120A includes a main body 120B and a wire 120C. Preferably, the wire 120C has a length that is two times or greater than the length of the first through hole 124A but less than three times the length of the first through hole 124A. The wire 120C includes one end that is fixed to the main body 120B and another end that is inserted through the first through hole 124A, extended over the outer side of the battery attachment portion 60, and attached to the main body 120B. This restricts movement of the coupling member 82B relative to the frame 12 and the battery pack 22.

Modifications

The description related with the above embodiments exemplify, without any intension to limit, applicable forms of an attachment member for a bicycle battery pack, a battery pack assembly including the attachment member, and a bicycle coupling member according to the present invention. In addition to the embodiments described above, an attachment member for a bicycle battery pack, a battery pack assembly including the attachment member, and a bicycle coupling member according to the present invention is applicable to, for example, modifications of the above embodiments that are described below and combinations of at least two of the modifications that do not contradict each other. In the modifications described hereafter, same reference numerals are given to those components that are the same as the corresponding components of the above embodiments. Such components will not be described in detail.

Figure 21:
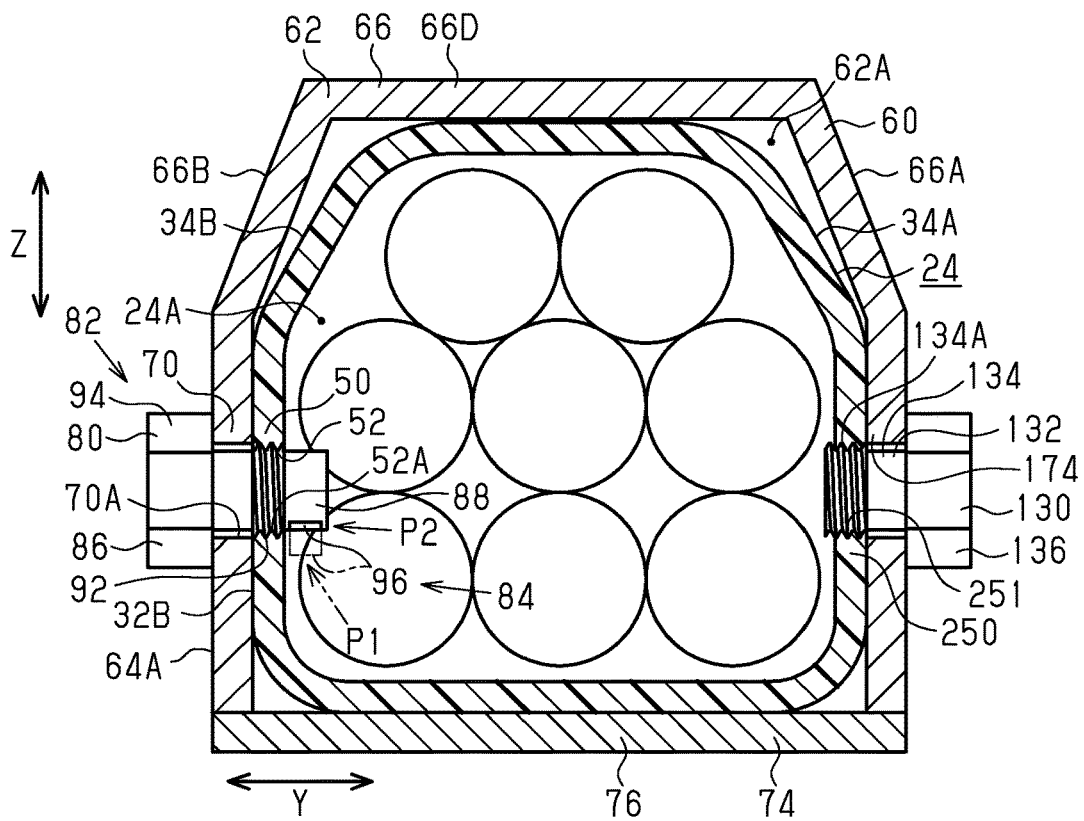
FIG. 21 is a cross-sectional view of a battery pack assembly in accordance with a first modification.

The above embodiments can include a second coupling member 130 formed separately from the coupling members 82, 82A, 82B and 122. For example, the second coupling member 130 shown in FIG. 21 is formed separately from the coupling member 82. The second coupling member 130 includes a second rod 134 having an outer circumference 132 and a sixth threaded portion 134A defined by at least part of the outer circumference 132. One end of the second rod 134 defines a restriction portion 136. The sixth threaded portion 134A is joined with a seventh threaded portion 251 provided in a third housing portion 250 to couple the battery pack 22 to the frame 12. In a state in which the battery pack 22 is arranged in the frame 12, the second coupling member 130 is inserted through a third frame portion 174 of the frame 12 and coupled to the first housing portion 50 of the housing 24 to restrict movement of the battery pack 22 relative to the frame 12. As shown in FIG. 21, in the first to third embodiments, the first frame portion 70 can be provided in the side walls 64A instead of the main wall 66. Further, among the side surfaces 32, the first housing portion 50 can be provided in the second side surface 32B instead of the intermediate surface 34C. In this case, as shown in FIG. 21, the coupling members 82 and 82A and the second coupling member 130 can be provided at positions faced toward each other in the second direction Y.

At least one of the coupling member 82 and the second coupling member 130 shown in FIG. 21 can be replaced by the coupling member 102 of the attachment member 80B of the modification shown in FIG. 17. When replacing the coupling member 82 with the coupling member 102, the first rod 106 of the coupling member 102 is shortened, and the first threaded portion 110 is coupled with the second threaded portion 52. When replacing the second coupling member 130 with the coupling member 102 of the attachment member 80B, the first rod 106 of the coupling member 102 is shortened, and the first threaded portion 110 is coupled with the seventh threaded portion 251.

The lock attachment portion 104 of the fourth embodiment can be formed integrally with the coupling member 102 as a one-piece member so that the lock attachment portion 104 is not removable from the coupling member 102. The coupling member 102 of the fourth embodiment can restrict movement of the battery pack 22 relative to the frame 12 by joining the first threaded portion 110 with a threaded portion provided in the hole 150A or 152A of one of the first housing portion 150 and the first housing portion 152. In this case, the third threaded portion 172A is omitted.

Figure 22:
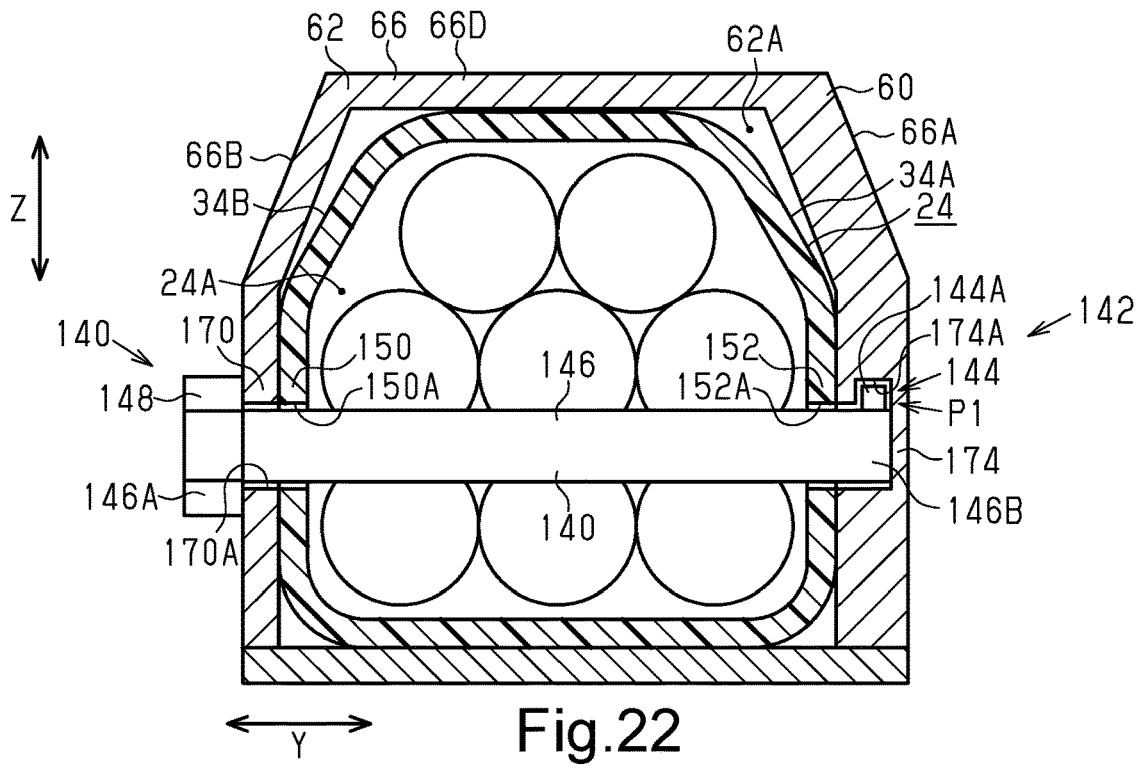
FIG. 22 is a cross-sectional view of a battery pack assembly in accordance with a second modification.

The attachment members 80 and 80A of the first and second embodiments can be replaced by an attachment member 140 shown in FIG. 22. The attachment member 140 includes a coupling member 142 and a lock 144. The attachment member 140 includes a first rod 146 and a restriction portion 148 provided on a first end 146A of the first rod 146 in the axial direction. The lock 144 includes a movable portion 144A that is projectable from the outer circumference of a second end 146B in the axial direction of the first rod 146. The first rod 146 is inserted through the first frame portion 170 provided in the side wall 64A, the first housing portion 150 provided in the second side surface 32B, and the first housing portion 152 provided in the first side surface 32A. The second end 146B is arranged in the third frame portion 174. The third frame portion 174 includes a recess 174A that allows the movable portion 144A to be located at the first position P1. A key operation is performed on the lock 144 to project the movable portion 144A from the recess 174A and restrict movement of the attachment member 140 relative to the battery pack 22 and the frame 12. In the structure shown in FIG. 22, a female thread can be formed in the hole 170A of the first frame portion 170, and a male thread can be formed on the circumferential surface of the first rod 146. In this case, the female thread of the hole 170A in the first frame portion 170 is joined with the male thread of the first rod 146 in a state in which the coupling member 142 is attached to the frame 12.

Figure 25:
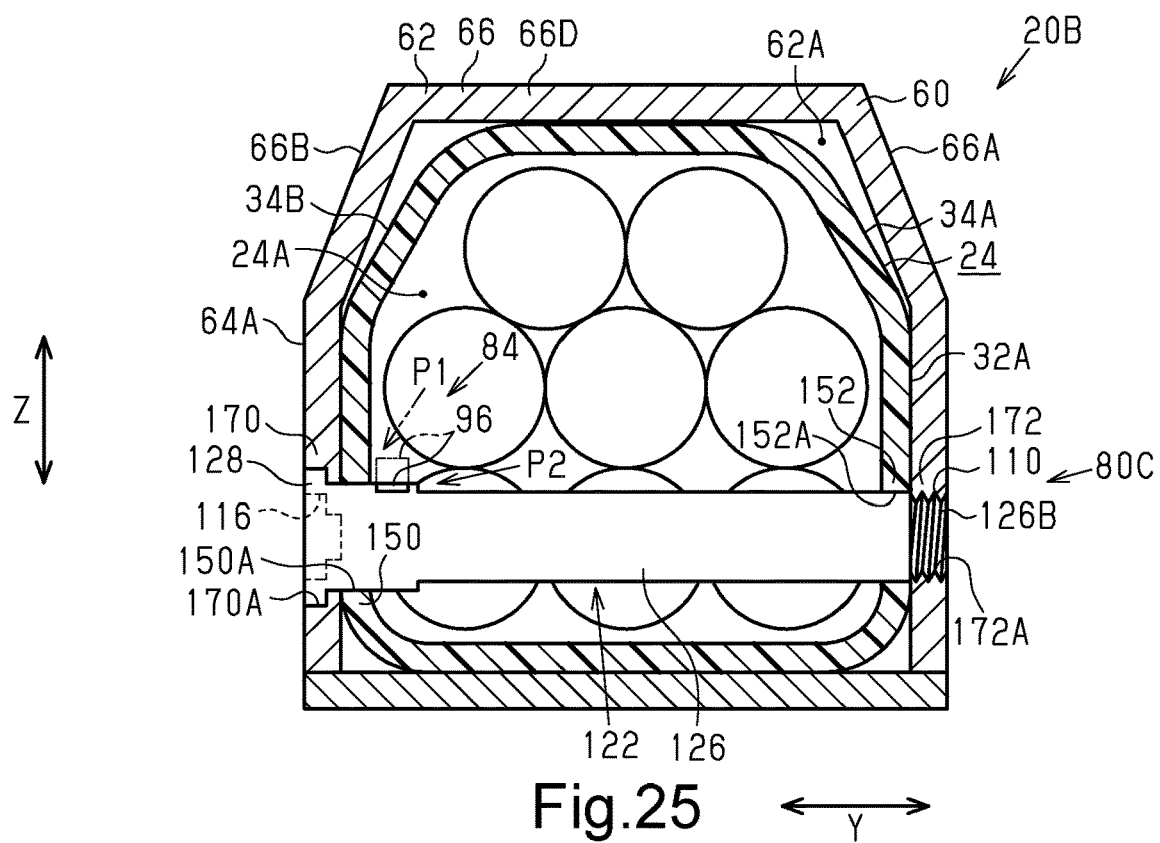
FIG. 25 is a cross-sectional view of a battery pack assembly in accordance with a fifth modification.

In the first to third embodiments, the modification illustrated in FIG. 21, and the modification illustrated in FIG. 25, which will be described later, the movable portion 96 can be provided on the first rod 88 to be arranged between the first housing portion 50 and the first frame portion 70 in a state located at the first position P1. Further, in the modification shown in FIG. 22, the movable portion 96 can be provided on the first rod 146 to be arranged between the first housing portion 152 and the third frame portion 174 in a state located at the first position P1.

In the first to third embodiments, the modification illustrated in FIG. 21, and the modification illustrated in FIG. 25, which will be described later, the movable portion 96 can be provided on the first rod 88 to be fitted into a groove formed in the hole 70A of the first frame portion 70 in a state in which the movable portion 96 is located at the first position P1. Further, in the first to third embodiments and the modification illustrated in FIG. 21, the movable portion 96 can be provided on the first rod 88 to be fitted into a groove formed in the threaded hole 52A of the first housing portion 50 in a state in which the movable portion 96 is located at the first position P1. In the modification illustrated in FIG. 22, the movable portion 96 can be provided on the first rod 146 to be fitted into a groove formed in at least one of the holes 150A and 152A of the first housing portions 150 and 152 in a state in which the movable portion 96 is located at the first position P1.

Figure 23:
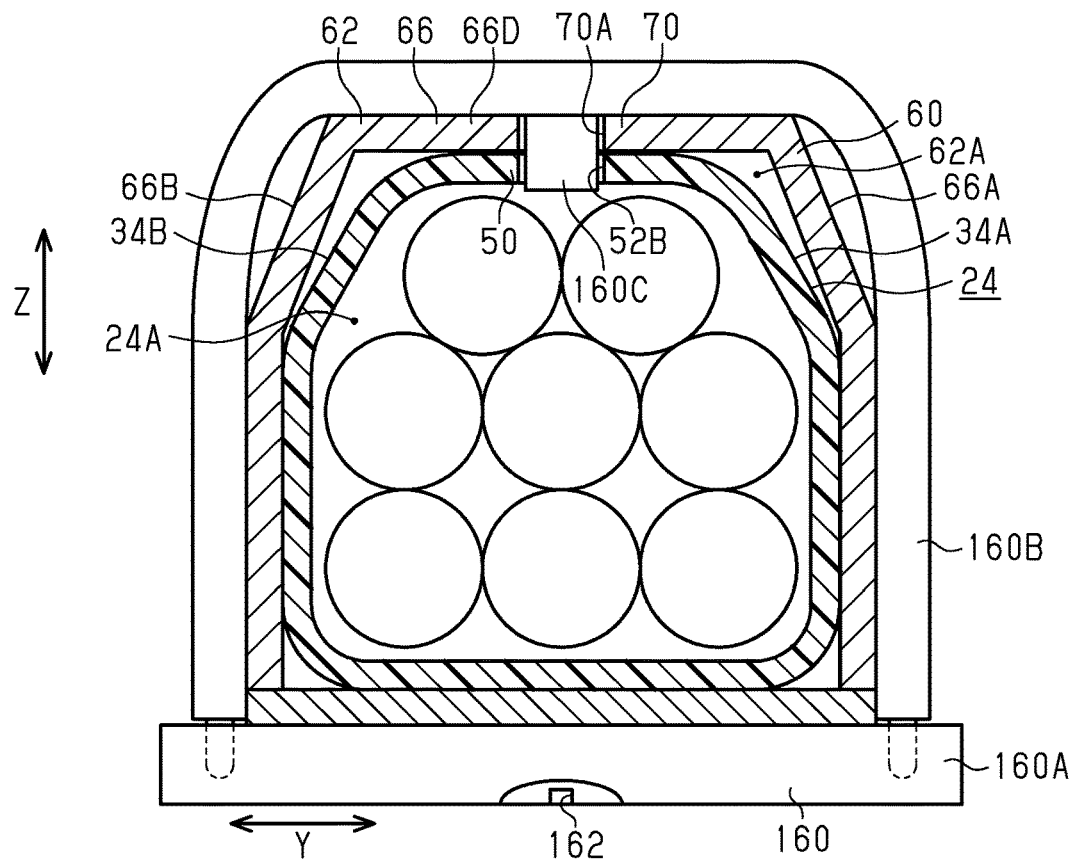
FIG. 23 is a cross-sectional view of a battery pack assembly in accordance with a third modification.

Referring to FIG. 23, an attachment member 160 can be U-shaped. The attachment member 160 includes a main body 160A, which incorporates a key cylinder, and a U-shaped portion 160B. The U-shaped portion 160B includes a projection 160C that projects inward from the closed end of the U-shaped portion 160B. The projection 160C is insertable into the hole 70A of the first frame portion 70 provided in the main wall 66 and the hole 52B of the first housing portion 50 provided at a location faced toward the first frame portion 70. The U-shaped portion 160B is attached to the main body 160A in a state in which the projection 160C of the U-shaped portion 160B is inserted into the hole 70A of the first frame portion 70 and the hole 52B of the first housing portion 50 so that the attachment member 160 restricts relative movement of the battery pack 22 and the frame 12. A key is inserted into a hole 162 of the main body 160A to switch the attachment member 160 from a release state to a restriction state.

Figure 24:
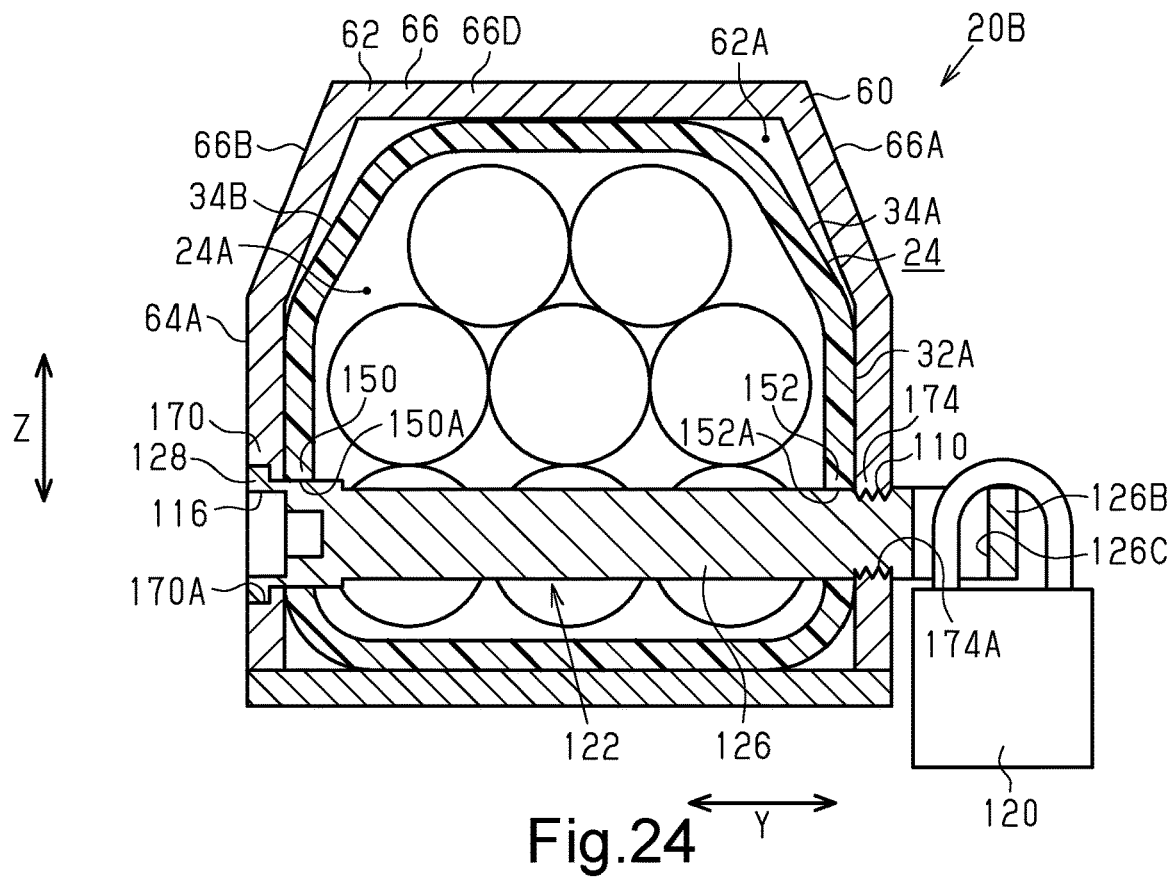
FIG. 24 is a cross-sectional view of a battery pack assembly in accordance with a fourth modification.

The lock attachment portion 124 of the fifth embodiment can be modified as shown in FIG. 24. The second end 126B of the first rod 126 projects outward from the third frame portion 174 in a state in which the coupling member 122 is attached to the frame 12 and the battery pack 22. The lock attachment portion 124 includes a second through hole 126C that extends through the second end 126B in a direction intersecting the axial direction of the first rod 126. The second through hole 126C is located at the outer side of the third frame portion 174 in a state in which the coupling member 122 is attached to the frame 12 and the battery pack 22. The lock 120 is attached to the second through hole 126C. As shown in FIG. 24, the first through hole 124A can be omitted from the first rod 126. The lock 120 can be replaced by the lock 120A including the wire 120C shown in FIG. 20.

The engagement portions 86 and 116 can be shaped to be engageable with only a specially-shaped tool. In this case, the engagement portions 86 and 116 are each configured to include, for example, a key pattern set by the positions and shapes of projections and recesses, and the specially-shaped tool includes a key pattern corresponding to the engagement portions 86 and 116. The engagement portions 86 and 116 can be operated only by the tool having the corresponding key pattern. In this case, a lock is configured by the engagement portions 86 and 116 and the specially-shaped tool.

The attachment member 80C of the fifth embodiment can be provided on the lock 84 of the first embodiment. In this case, the lock attachment portion 124 is omitted as shown in FIG. 25. In FIG. 25, the movable portion 96 of the lock 84 is provided, for example, on the first rod 126 in the vicinity of the first housing portion 150 and toward the first housing portion 152 from the first housing portion 150. The movable portion 96 is provided in the first rod 126 to be projectable from the outer circumferential surface 90A of the first rod 126. The movable portion 96 is movable in its axial direction between the first position P1, at which the movable portion 96 is in the restriction state and can contact at least one of the frame 12 and the battery pack 22 from the other side in the axial direction, and the second position P2, at which the movable portion 96 is in the release state and cannot contact the frame 12 and the battery pack 22 from the other side in the axial direction. The movable portion 96 is provided in the first rod 126 to be movable between the first position P1, at which the movable portion 96 projects outward from the outer circumference 90 of the first rod 126 in the radial direction of the first rod 126, and the second position P2, at which the movable portions 96 is retracted from the first position P1 toward the outer circumference 90 of the first rod 126.

The locks 84, 120, and 120A of the second, fourth, and fifth embodiments, and the lock 120 of the above modification can be provided with the electronic controller 85A and the actuator 85B like in the lock 84A of the third embodiment to perform locking based on a signal from the external operation device C.

The attachment members 80, 80A, 140, and 160 can be used as bicycle coupling members used to attach a bicycle component other than the battery pack assembly 20 to the frame 12.

In the above embodiments, the battery attachment portion 60 is provided on the down tube 12C, and the first engagement portion 68 and the second engagement portion 40 are located at the side of the head tube 12A. Instead, the first engagement portion 68 and the second engagement portion 40 can be located at the side of the seat tube 12E.

What is claimed is:

1. An attachment member for attaching a bicycle battery pack to a frame of a bicycle, and the bicycle battery pack including a housing configured to accommodate a battery cell, the attachment member comprising:
    a coupling member that restricts movement of the bicycle battery pack relative to the frame while the attachment member is in an attachment state in which the bicycle battery pack is attached to the frame, the coupling member being configured to extend through a first frame portion of the frame and to be coupled to a first housing portion of the housing of the bicycle battery pack while the attachment member is in the attachment state, the coupling member including
        a first rod that includes an outer circumference and a first threaded portion defined by at least part of the outer circumference,
        a restriction portion extending from the outer circumference of the first rod in a radial direction of the first rod; and
    a lock including a movable portion provided on the coupling member and configured to project from an outer circumferential surface of the first rod, the movable portion being switchably configured to switch between a restriction state in which the movable portion is in a first position that projects outward from the first rod in the radial direction of the first rod to restrict movement of the coupling member relative to the housing and the frame while the attachment member is in the attachment state, and a release state in which the movable portion is in a second position that is retracted from the first position and to move toward the outer circumference to permit movement of the coupling member relative to the housing and the frame while the attachment member is in the attachment state,
    the lock further including an electronic controller and an actuator, the electronic controller driving the actuator based on a signal received from an external operation device so that the actuator moves the movable portion between the first and second positions.

2. The attachment member according to claim 1, wherein the first threaded portion is joined with a second threaded portion provided in the first housing portion so that the coupling member restricts movement of the battery pack relative to the frame while the attachment member is in the attachment state.

3. The attachment member according to claim 1, wherein the restriction portion contacts the first frame portion and restricts movement of the first rod toward one side in an axial direction while the attachment member is in the attachment state, and
    the movable portion is configured to contact at least one of the frame and the battery pack from another side in the axial direction while the attachment member is in the attachment state when the movable portion is in the first position, and the movable portion is configured not to contact the frame and the battery pack from the other side in the axial direction while the attachment member is in the attachment state when the movable portion is in the second position.

4. The attachment member according to claim 3, further comprising
an engagement portion that is provided on the restriction portion and is engageable with a tool that rotates the first threaded portion.

5. The attachment member according to claim 1, wherein
the frame includes a shell that accommodates at least part of the bicycle battery pack, and
the first frame portion includes a side wall of the shell.

6. A battery pack assembly comprising the attachment member according to claim 1; and further comprising
a bicycle battery pack attached to the attachment member.

7. An attachment member for attaching a bicycle battery pack to a frame of a bicycle, and the bicycle battery pack including a housing configured to accommodate a battery cell, the attachment member comprising:
a coupling member including
a first rod that includes an outer circumference and a first threaded portion defined by at least part of the outer circumference,
a restriction portion extending from the outer circumference of the first rod in a radial direction of the first rod; and
a lock including a movable portion provided on the coupling member and configured to project from an outer circumferential surface of the first rod, the movable portion being switchably configured to switch between a restriction state in which the movable portion is in a first position that projects outward from the first rod in the radial direction of the first rod and a release state in which the movable portion is in a second position that is retracted from the first position and is positioned toward the outer circumference with respect to the first position,
the lock further including an electronic controller and an actuator, the electronic controller driving the actuator based on a signal received from an external operation device so that the actuator moves the movable portion between the first and second positions.

* * * * *